(12) United States Patent
Kitajima et al.

(10) Patent No.: US 12,214,306 B2
(45) Date of Patent: Feb. 4, 2025

(54) FILTER DEVICE

(71) Applicant: YAMASHIN-FILTER CORP., Kanagawa (JP)

(72) Inventors: Nobuyuki Kitajima, Kanagawa (JP); Mitsunobu Okamoto, Kanagawa (JP); Mitsuhiro Yamaguchi, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 541 days.

(21) Appl. No.: 17/501,658

(22) Filed: Oct. 14, 2021

(65) Prior Publication Data

US 2022/0032216 A1    Feb. 3, 2022

Related U.S. Application Data

(63) Continuation of application No. PCT/JP2020/017366, filed on Apr. 22, 2020.

(30) Foreign Application Priority Data

Apr. 23, 2019  (JP) .................................. 2019-081964
Dec. 13, 2019  (JP) .................................. 2019-225661

(51) Int. Cl.
  *B01D 35/14* (2006.01)
  *B01D 29/33* (2006.01)
  (Continued)

(52) U.S. Cl.
  CPC ......... *B01D 35/1475* (2013.01); *B01D 29/33* (2013.01); *B01D 29/50* (2013.01);
  (Continued)

(58) Field of Classification Search
  CPC .... B01D 35/1475; B01D 29/33; B01D 29/50; B01D 35/027; B01D 35/306;
  (Continued)

(56) References Cited

U.S. PATENT DOCUMENTS 8,216,467 B2 *  7/2012  Lauer .................. B01D 35/147
                                              210/240
8,480,774 B2   7/2013  Wilkendorf et al.
(Continued)

FOREIGN PATENT DOCUMENTS

CN     101868289 A  * 10/2010  ............. B01D 29/21
CN     107614895 A  *  1/2018  ......... B01D 19/0057
(Continued)

OTHER PUBLICATIONS

International Search Report issued in PCT/JP2020/017366 mailed on Jul. 21, 2020 with English Translation (5 pages).
(Continued)

*Primary Examiner* — Waqaas Ali
(74) *Attorney, Agent, or Firm* — Nakanishi IP Associates, LLC

(57) ABSTRACT

An outflow portion that causes a space inside a filter element to communicate with a space outside a filter case includes an upper surface and a bottom surface that are provided so as to be separated from each other. The back pressure valve includes the valve body having the substantially plate-like shape and the elastic member provided between the bottom surface and the valve body. The valve body is movable between a closed position in which the valve body is in contact with the upper surface, and an open position in which the valve body is not in contact with the upper surface. A recessed portion is provided in a surface, of the valve body, that comes into contact with the upper surface, and an outflow port is formed in a side surface or the upper surface of the outflow portion.

17 Claims, 27 Drawing Sheets

(51) Int. Cl.
    *B01D 29/50*     (2006.01)
    *B01D 35/027*     (2006.01)
    *B01D 35/147*     (2006.01)
    *B01D 35/30*     (2006.01)
    *B01D 36/00*     (2006.01)

(52) U.S. Cl.
    CPC ......... *B01D 35/027* (2013.01); *B01D 35/306* (2013.01); *B01D 36/001* (2013.01)

(58) Field of Classification Search
    CPC .............. B01D 36/001; B01D 35/1576; B01D 2201/301; B01D 29/606; B01D 2201/4053; B01D 2201/52; B01D 29/58; B01D 29/21; B01D 35/0276; B01D 35/153
    See application file for complete search history.

(56) References Cited

U.S. PATENT DOCUMENTS

| | | | |
|---|---|---|---|
| 10,272,373 | B2 | 4/2019 | Taku et al. |
| 2009/0057213 | A1 | 3/2009 | Schiavon et al. |
| 2009/0314697 | A1 | 12/2009 | Ardes |
| 2010/0219113 | A1 | 9/2010 | Giarelli |
| 2010/0257824 | A1 | 10/2010 | Wilkendorf et al. |
| 2012/0145625 | A1 | 6/2012 | Schiavon et al. |
| 2015/0246304 | A1 | 9/2015 | Moessinger et al. |
| 2018/0104629 | A1 | 4/2018 | Taku et al. |
| 2018/0147511 | A1 | 5/2018 | Kitajima et al. |
| 2018/0229162 | A1 | 8/2018 | Oshita et al. |
| 2020/0016519 | A1 | 1/2020 | Ishizuka |
| 2020/0215464 | A1 | 7/2020 | Kitajima et al. |

FOREIGN PATENT DOCUMENTS

| | | |
|---|---|---|
| CN | 111828413 B | 10/2022 |
| EP | 2357030 A1 | 8/2011 |
| EP | 3711836 A1 | 9/2020 |
| JP | 2009-536088 A | 10/2009 |
| JP | 2017-80716 A | 5/2017 |
| JP | 2018-86625 A | 6/2018 |
| JP | 2018-155279 A | 10/2018 |
| JP | 2019-93317 A | 6/2019 |
| WO | 2005/063358 A2 | 7/2005 |
| WO | 2019/098176 A1 | 5/2019 |

OTHER PUBLICATIONS

Extended European Search Report issued in European Patent Application No. 20796275.4, mailed on Mar. 30, 2022 (7 pages).

* cited by examiner (A)

(B)

FILTER DEVICE

CROSS-REFERENCE TO RELATED APPLICATIONS

This application is a continuation application of International Patent Application No. PCT/JP2020/017366 filed on Apr. 22, 2020, which claims priority to Japanese Patent Application No. 2019-081964 filed on Apr. 23, 2019 and Japanese Patent Application No. 2019-225661 filed on Dec. 13, 2019, the entire contents of which are incorporated by reference.

TECHNICAL FIELD

The present invention relates to a filter device.

BACKGROUND ART

Patent Document 1 discloses a liquid filter including a check valve that blocks a flow path of liquid when an internal combustion engine is stopped.

CITATION LIST

Patent Literature

Patent Document 1: JP 2009-536088 A

In Patent Document 1, the flow path of the liquid is completely blocked when the internal combustion engine is stopped. Thus, when the internal combustion engine is stopped to replace a filter element, the liquid trapped in a filter case is removed together with the filter element, and this liquid drips to the outside of the liquid filter.

SUMMARY OF INVENTION

One or more embodiments of the present invention provide a filter device in which liquid can be prevented from dripping to the outside when a filter element is replaced.

A filter device according to one or more embodiments of the present invention is, for example, a filter device provided in a tank for storing liquid. The filter device includes a filter case mounted on the tank and having a bottomed substantially tubular shape with an open upper end, a filter element provided inside the filter case and including a first filter medium having a substantially tubular shape, a lid body provided at the filter case and the filter element to cover the upper end of the filter case, and including an air vent hole configured to cause a space inside the filter element to communicate with a space outside the filter case, an inflow portion configured to cause the liquid to flow into an interior of the filter case and a space outside the filter element, an outflow portion configured to cause the space inside the filter element to communicate with the space outside the filter case, and a back pressure valve provided at the outflow portion. The outflow portion includes an upper surface and a bottom surface provided separated from each other, and a first tubular portion provided protruding in an upward direction from the upper surface and mounted in a through-hole formed in the filter case. The upper surface includes a first hole that communicates with a hollow portion of the first tubular portion and through which the liquid flows into the outflow portion. An outflow port through which the liquid flows out from the outflow portion is provided in a side surface or the upper surface of the outflow portion. The back pressure valve includes a valve body having a plate shape (substantially plate-like shape), and a first elastic member provided between the bottom surface and the valve body. The valve body is movable between a closed position in which the valve body is in contact with the upper surface and covers the first hole, and an open position in which the valve body is not in contact with the upper surface. A recessed portion is provided in a surface, of the valve body, that comes into contact with the upper surface, and in the closed position, a space formed between the recessed portion and the upper surface causes the space inside the filter element to communicate with the space outside the filter case.

According to the filter device according to one or more embodiments of the present invention, the outflow portion that causes the space inside the filter element to communicate with the space outside the filter case includes the upper surface and the bottom surface that are provided so as to be separated from each other. The back pressure valve includes the valve body having the substantially plate-like shape and the elastic member provided between the bottom surface and the valve body. The valve body is movable between the closed position in which the valve body is in contact with the upper surface and the valve body covers the first hole, and the open position in which the valve body is not in contact with the upper surface. The recessed portion is provided in the surface, of the valve body, that comes into contact with the upper surface, and in the closed position, the space formed between the recessed portion and the upper surface causes the space inside the filter element to communicate with the space outside the filter case. Thus, when an engine is stopped, oil in the filter element can be drained by causing the liquid to flow out of the filter case without removing the lid body from the filter case. As a result, it is possible to prevent hydraulic oil from dripping to the outside of the filter device (to prevent oil dripping from occurring) during replacement. Further, because air in the filter case is discharged via the air vent hole, it is possible to prevent erosion, or the like from occurring.

The filter case may be provided inside the tank, and the lid body may be provided on an upper side of the tank. Both ends of the air vent hole may be open in a surface on the lower side of the lid body, and may cause the space inside the filter element to communicate with the space outside the filter case and a space inside the tank. As a result, even when the hydraulic oil passes through the air vent hole, the hydraulic oil can be returned to the tank.

A portion, of the filter case, adjacent to an opening at an upper end of the filter case is narrowed. As a result, when the liquid passes through the air vent hole, the liquid flows into the tank via the filter case. Thus, it is possible to prevent air bubbles from being generated in the liquid stored in the tank.

The filter device includes a second filter medium having a substantially tubular shape. An upper side of the second filter medium is covered by the bottom surface, a mounting member is provided on a lower side of the second filter medium, and the second filter medium is provided in the tank via the mounting member. As a result, the total length of the filter device, which is obtained by integrating a return filter and a suction strainer, can be shortened.

The filter device includes a second filter medium having a substantially tubular shape. A plate-like member configured to cover an upper side of the second filter medium is provided on the upper side of the second filter medium, and the bottom surface is detachably provided at the plate-like member. A second elastic member is provided between the plate-like member and the bottom surface, a mounting member is provided on a lower side of the second filter medium, and the second filter medium is provided in the tank via the mounting member. As a result, the total length of the filter device can be adjusted. Further, the outflow portion and the second filter medium can be made detachable.

The bottom surface includes a second tubular portion protruding downward and having a substantially tubular shape. The plate-like member includes a third tubular portion having a diameter greater than a diameter of the second tubular portion and having a substantially tubular shape, and a claw portion provided protruding inward in a radial direction of the third tubular portion. The claw portion has elasticity, and the claw portion elastically deforms and presses against the second tubular portion when the second tubular portion is inserted into an inner side of the third tubular portion. As a result, the outflow portion can be reliably mounted on the plate-like member, while keeping the outflow portion and the plate-like member detachable.

The second tubular portion has a substantially cylindrical shape. A groove including a first groove extending substantially along a horizontal direction, and a second groove and a third groove respectively provided at both ends of the first groove, is formed in an outer peripheral surface of the second tubular portion. The second groove and the third groove extend from the first groove toward a lower side in a vertical direction, a lower end of the second groove reaches a lower end of the second tubular portion, and a lower end of the third groove does not reach the lower end of the second tubular portion. As a result, by pushing and turning the outflow portion and moving the claw along the groove, the outflow portion can be reliably mounted on the plate-like member. Further, because the lower end of the third groove does not reach the lower end of the tubular portion, the outflow portion does not come out from the plate-like member when adjusting the total length of the filter device using the elastic member.

The filter element includes an upper plate provided at an end on the upper side of the first filter medium, a projection portion protruding downward is formed at a back surface of the lid body, and a second hole into which the projection portion is inserted is formed in the upper plate. As a result, it is possible to prevent a filter element other than a genuine product from being used.

The filter element includes an upper plate provided at an end on an upper side of the first filter medium. The upper plate includes a fourth tubular portion disposed adjacent to an inner side of the first filter medium and having a substantially tubular shape. The lid body includes a protrusion portion, a tip of the protrusion portion being inserted into the fourth tubular portion. The air vent hole includes an open end formed in the protrusion portion, and the open end has a substantially conical shape or a substantially truncated cone shape having an inner diameter becoming smaller toward its upper part. As a result, air bubbles generated inside the filter element are easily accumulated in the air vent hole. Further, because the air bubbles accumulated at the open end become concentrated in an area that becomes narrower as the air bubbles rise upward, the air bubbles easily escape from the air vent hole.

The upper surface includes a side surface portion having a truncated cone shape. Thus, the hydraulic oil can be caused to flow diagonally downward along the side surface portion. As a result, it is possible to prevent the hydraulic oil from hitting a side surface of the tank, and to thus prevent a failure (foaming of the hydraulic oil, or the like) from occurring as a result of the hydraulic oil hitting the side surface of the tank.

The outflow port is formed in the upper surface at a position overlapping with the recessed portion in a (top) plan view. As a result, the hydraulic oil that has flowed through a space between the recessed portion and the upper surface easily flows out into the space outside the filter case.

The side surface of the outflow portion has an opening between the bottom surface and the upper surface, and the opening is the outflow port. As a result, the hydraulic oil easily flows diagonally downward along the side surface portion.

An inclined surface is provided at a surface, of the bottom surface, facing the upper surface. As a result, the hydraulic oil can be caused to flow diagonally downward along the inclined surface.

The inclined surface is partially notched. As a result, the volume between the bottom surface and the upper surface can be increased. Thus, even when the engine starts operating, thereby causing a large amount of the hydraulic oil to flow, a flow of the hydraulic oil is not hindered.

According to one or more embodiments of the present invention, it is possible to prevent liquid from dripping to the outside when replacing a filter element.

DESCRIPTION OF EMBODIMENTS

Hereinafter, embodiments of the present invention will be described in detail with reference to the drawings. In the present embodiment, while hydraulic oil is described as an example of liquid to be filtered, the liquid to be filtered is not limited to the hydraulic oil. Also, while the following embodiments are described with an example of a return filter, a filter device of the present invention is not limited to the return filter.

First Embodiment

Figure 1:
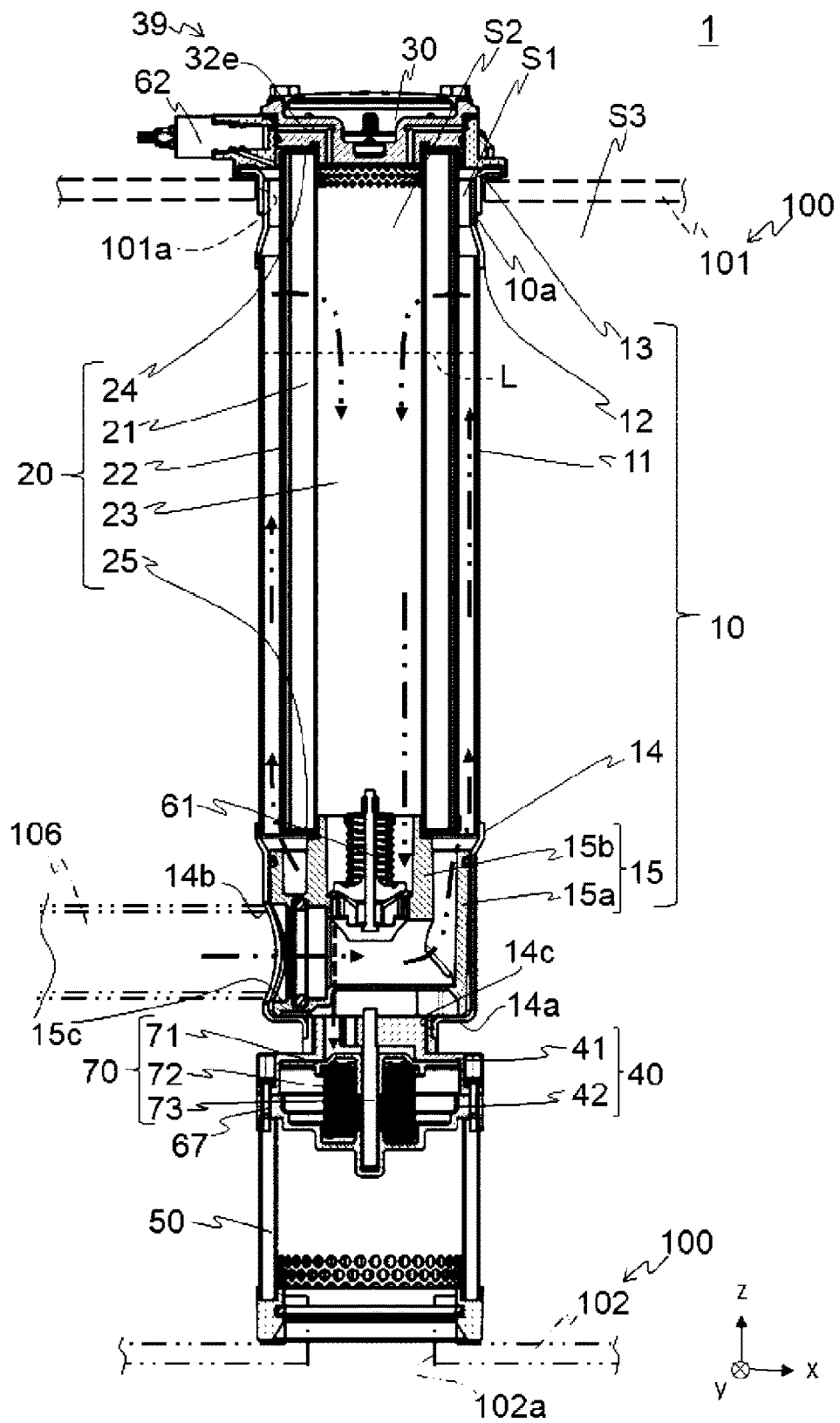
FIG. 1 is a cross-sectional view schematically illustrating a filter device 1 according to an embodiment of the present invention.

FIG. 1 is a cross-sectional view schematically illustrating a filter device 1 according to an embodiment of the present invention. In FIG. 1, hatching indicating a cross section is partially omitted.

The filter device 1 is obtained by integrating a return filter and a suction strainer. The filter device 1 is provided in a tank 100. The tank 100 is a tank for storing the hydraulic oil, and has a box-shape, for example. The tank 100 is installed in a work machine (not illustrated) (e.g., a hydraulic device), and is provided in a hydraulic circuit of hydraulic oil supplied to the hydraulic device. However, the tank 100 is not limited to one provided in the hydraulic circuit.

An opening 101a on which the filter device 1 is mounted is formed in an upper surface 101 of the tank 100. The filter device 1 is mounted on the upper surface 101 via a mounting plate 105 (see FIG. 3). However, the mounting plate 105 is not necessarily required.

An inflow pipe 106, which has a substantially tubular shape and causes the hydraulic oil to flow into the filter device 1, is inserted and fitted into a side surface (not illustrated) of the tank 100. The inflow pipe 106 introduces the hydraulic oil from the outside of the tank 100 to the filter device 1. The hydraulic oil introduced into the filter device 1 is filtered by the filter device 1 and stored in the tank 100.

An outflow port 102a, which causes the hydraulic oil in the tank 100 to flow out to a hydraulic pump (not illustrated) and the like, is formed in a bottom surface 102 of the tank 100. A suction strainer 50 is provided on the inner side of the tank 100, and the hydraulic oil that has passed through the suction strainer 50 flows out from the outflow port 102a to the outside of the tank 100. Note that the outflow port 102a may be provided in the side surface of the tank 100.

Next, the filter device 1 will be described. The filter device 1 mainly includes a filter case 10, a filter element 20, a lid body 30, an outflow portion 40, the suction strainer 50, and a back pressure valve 70.

The filter case 10 is formed of a material having high corrosion resistance (e.g., a metal such as stainless steel). The filter case 10 is provided inside the tank 100 so as to protrude from the upper surface 101 of the tank 100 to the lower side (−z side).

The filter case 10 has a bottomed substantially tubular shape and has an open upper end surface. The filter case 10 is hollow inside and internally includes the filter element 20, and the like. Note that a substantially tubular shape is a concept including a substantially cylindrical shape, a substantially elliptic cylindrical shape, and the like, and in the present embodiment, a case is illustrated in which the substantially tubular shape is the substantially cylindrical shape.

The filter case 10 mainly includes a first case 11 having a substantially tubular shape, a second case 12 having a substantially tubular shape, a mounting portion 13, a third case 14, and an inner case 15. The second case 12 and the mounting portion 13 are provided on the upper side (+z side) of the first case 11.

Figure 2:
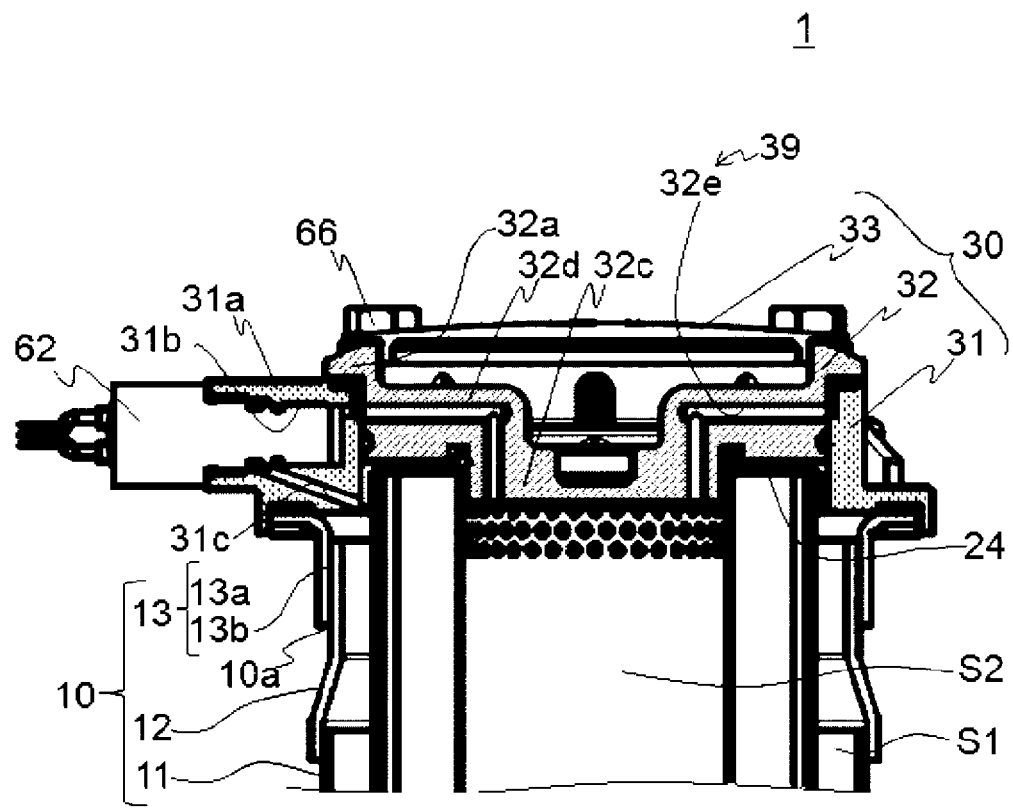
FIG. 2 is a diagram illustrating a vicinity of the upper end of the filter device 1 in an enlarged manner.
Figure 2:
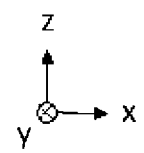

FIG. 2 is a diagram illustrating a vicinity of the upper end of the filter device 1 in an enlarged manner. In FIG. 2, hatching indicating a cross section is partially omitted. The mounting portion 13 is a member for mounting the filter case 10 on the upper surface 101 of the tank 100, and includes a plate-like portion 13a mounted on the lid body 30, and a tubular portion 13b provided on the lower side of the plate-like portion 13a. A small diameter portion 12a of the second case 12 is provided in the tubular portion 13b. Note that the second case 12 and the mounting portion 13 may be a single component.

A portion, of the filter case 10, adjacent to an opening at the upper end thereof is an upper end portion 10a that here corresponds to the small diameter portion 12a and the tubular portion 13b (see FIG. 2). The diameter of the upper end portion 10a is smaller than the diameters of portions other than the upper end portion 10a, such as the first case 11 and the third case 14, for example. In other words, the upper end portion 10a of the filter case 10 is narrowed.

The description will now return to FIG. 1. The third case 14 and the inner case 15 are provided on the lower side of the first case 11. The third case 14 has a bottomed substantially tubular shape, and the inner case 15 is provided inside the third case 14.

A through-hole 14c is formed in the bottom surface 14a of the third case 14. The outflow portion 40 is provided in the through-hole 14c. The outflow portion 40 causes a space inside the filter element 20 to communicate with a space outside the filter case 10. The outflow portion 40 will be described in detail later. A hole 14b into which the inflow pipe 106 is inserted is provided in a side surface of the third case 14. Note that the hole 14b may be provided at a location other than the side surface of the third case 14, or the through-hole 14c may be provided at a location other than the bottom surface 14a.

The inner case 15 is a member that divides a space inside the third case 14 into two, and includes a tubular portion 15a on the outer side and a tubular portion 15b on the inner side. A hole 15c into which the inflow pipe 106 is inserted is provided in the tubular portion 15a. The hole 15c and the hole 14b are inflow portions that cause the liquid to flow into the interior of the filter case 10 and into a space (a space SD outside the filter element 20. A valve 61 is provided in the tubular portion 15b.

The valve 61 is usually closed, but when a filter medium 21 is clogged and the pressure inside the filter case 10 increases, the valve 61 opens to cause the hydraulic oil to flow from the space S1 to a space (a space S2) inside the filter element 20, thus preventing breakage of the filter device 1. Because the valve 61 is already known, a description thereof is omitted.

The filter element 20 is a member having a bottomed substantially tubular shape, and is provided inside the filter case 10. The filter element 20 mainly includes the filter medium 21, an outer tube 22, an inner tube 23, and plates 24, 25. The outer tube 22, the inner tube 23, and the plates 24, 25 are integrated with the filter medium 21.

The filter medium 21 is a member having a substantially cylindrical shape and having openings at both ends. The filter medium 21 is formed by pleating a filter paper using, for example, synthetic resin or a paper, and connecting both ends of the pleated filter paper to form a cylindrical shape. The outer tube 22 is provided on the outer side of the filter medium 21, and holes through which the hydraulic oil passes are formed over a substantially entire area of the outer tube 22. Further, the inner tube 23 is provided on the inner side of the filter medium 21, and holes through which the hydraulic oil passes are formed over a substantially entire area of the inner tube 23. Note that the inner tube 23 is not necessarily required.

The plate 24 is provided at the upper ends of the filter medium 21, the outer tube 22, and the inner tube 23. The plate 24 is in contact with the lid body 30.

The plate 25 is provided at the lower ends of the filter medium 21, the outer tube 22, and the inner tube 23. A portion, of the tubular portion 15b, in the vicinity of the upper end thereof is inserted into a hollow portion of the plate 25. As a result, the filter element 20 is provided in the filter case 10.

The lid body 30 is provided on the outer side of the tank 100 (in the present embodiment, on the upper side of the upper surface 101). The lid body 30 is provided on the filter case 10 (here, the mounting portion 13) and the filter element 20 (here, the plate 24) so as to cover the opening in the upper end surface of the filter case 10.

Figure 3:
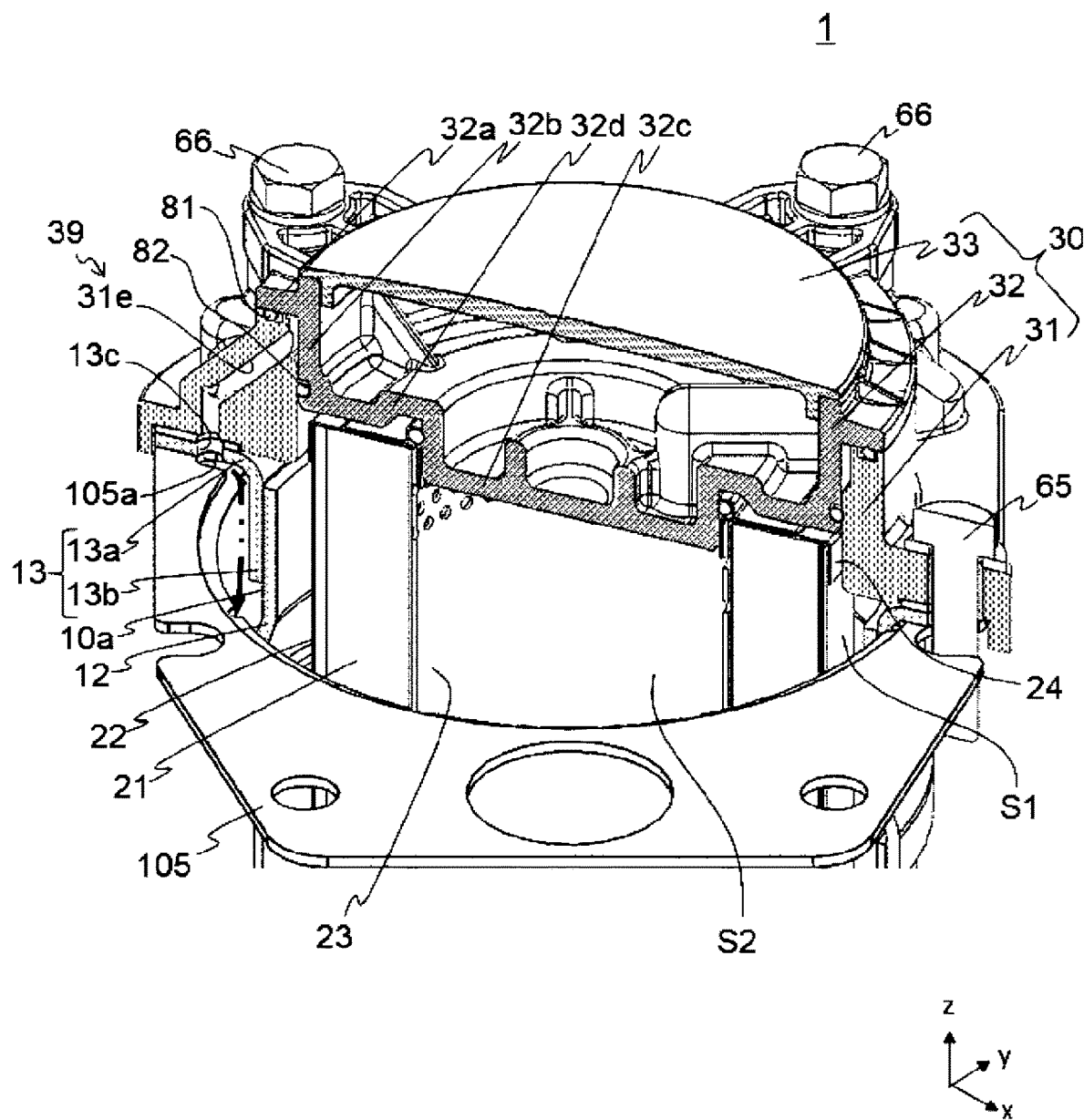
FIG. 3 is a cross-sectional perspective view of the filter device 1.

FIG. 3 is a cross-sectional perspective view of the filter device 1. In FIG. 3, hatching indicating a cross section is partially omitted. The lid body 30 mainly includes a mounting portion 31, a lid main body 32, and a cover 33.

The mounting portion 31 has a substantially tubular shape, and is fixed by a screw 65 to the filter case 10 (here, the mounting portion 13) and the tank 100 (not illustrated in FIGS. 2 and 3). As illustrated in FIG. 2, the mounting portion 31 includes a protrusion portion 31a protruding outward. A cavity 31b is formed in the protrusion portion 31a, and a differential pressure sensor 62 is provided in the cavity 31b. A hole 31c that causes the cavity 31b to communicate with the space S1 is formed in the protrusion portion 31a.

As illustrated in FIG. 3, the lid main body 32 is a member having a substantially thick plate-like shape, and is provided so as to cover a hollow portion of the mounting portion 31 from the upper side of the mounting portion 31. The lid main body 32 is fixed to the mounting portion 31 by screws 66. Sealing members 81, 82 that prevent leakage of the hydraulic oil are provided between the mounting portion 31 and the lid main body 32.

The lid main body 32 mainly includes a flange portion 32a, a first tubular portion 32b having a substantially tubular shape and disposed inside the flange portion 32a, a second tubular portion 32c having a bottomed substantially tubular shape and disposed inside the first tubular portion 32b, and a plate-like portion 32d having a substantially plate-like shape and configured to couple the first tubular portion 32b with the second tubular portion 32c. The flange portion 32a is in contact with an upper surface of the mounting portion 31, and the first tubular portion 32b is in contact with an inner peripheral surface of the mounting portion 31. A lower surface of the plate-like portion 32d is in contact with the plate 24, and the second tubular portion 32c is inserted into the inner side of the inner tube 23.

As illustrated in FIG. 2, the lid main body 32 is provided with a plurality of holes 32e, which serve as a flow path of air and the hydraulic oil. One end of one of the holes 32e, of the plurality of holes 32e, is open to the cavity 31b, and causes the cavity 31b to communicate with the space S2. Because the hole 31c causes the cavity 31b to communicate with the space S1, by providing the differential pressure sensor 62 in the mounting portion 31, a difference between the pressure inside the filter case 10 and the pressure outside the case is detected. The other holes 32e communicate with a hole 31e (see FIG. 3) formed in the mounting portion 31.

As illustrated in FIGS. 2 and 3, the hole 31e and the holes 32e are air vent holes 39, and both ends thereof are open to a surface, on the lower side, of the lid body 30. The hole 31e and the holes 32e cause the space S2 to communicate with the space S3 (see FIG. 1) via a hole 13c formed in the mounting portion 13 and a notch 105a formed in the mounting plate 105. Here, the space S3 is a space outside the filter case 10 and inside the tank 100. Note that the mounting portion 13 and the mounting plate 105 are not necessarily required, and when these components are not present, the hole 31e and the holes 32e directly cause the space S2 to communicate with the space S3.

The cover 33 is provided on the lid main body 32. The cover 33 is a member having a substantially plate-like shape, and is provided on the upper side of the lid main body 32. Note that the lid main body 32 and the cover 33 may be a single member.

The description will now return to FIG. 1. The outflow portion 40 is provided on the lower side of the filter case 10 so as to cover the through-hole 14c provided in the bottom surface 14a of the third case 14. The outflow portion 40 causes the space S2 to communicate with the space S3. The suction strainer 50 is provided on the lower side of the outflow portion 40.

Figure 4:
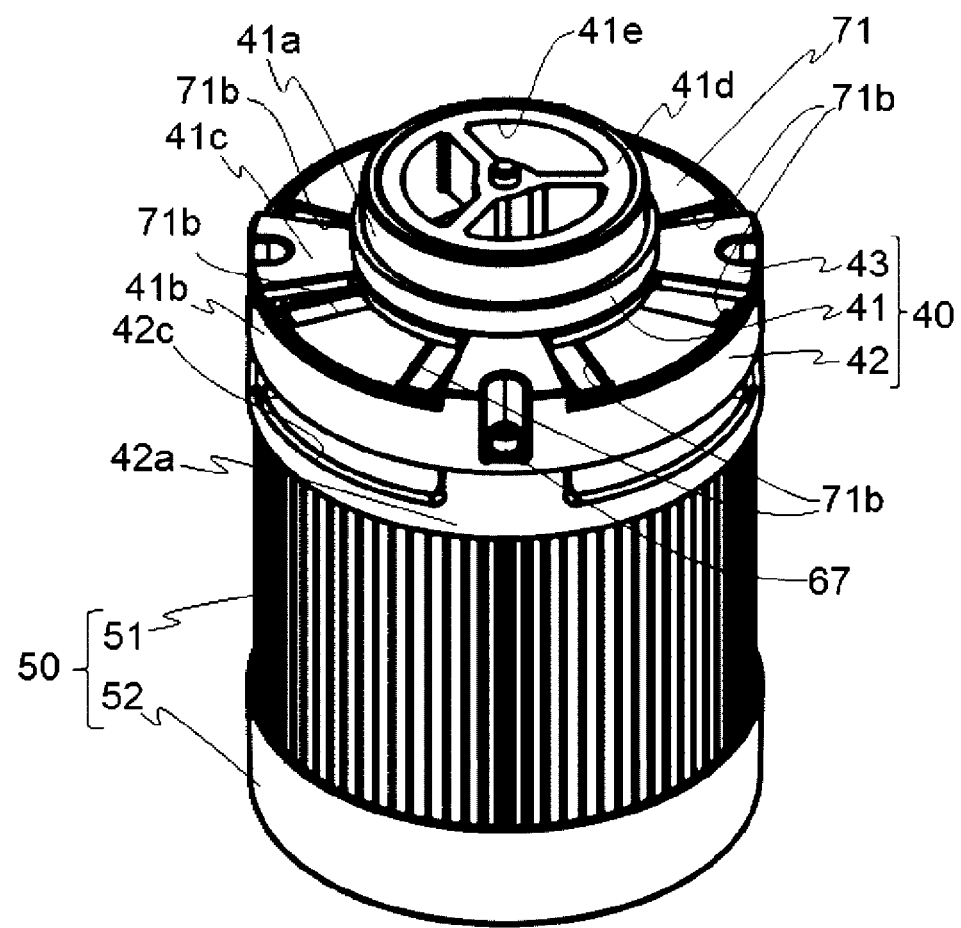
FIG. 4 is a perspective view of an outflow portion 40 and a suction strainer 50.
Figure 5:
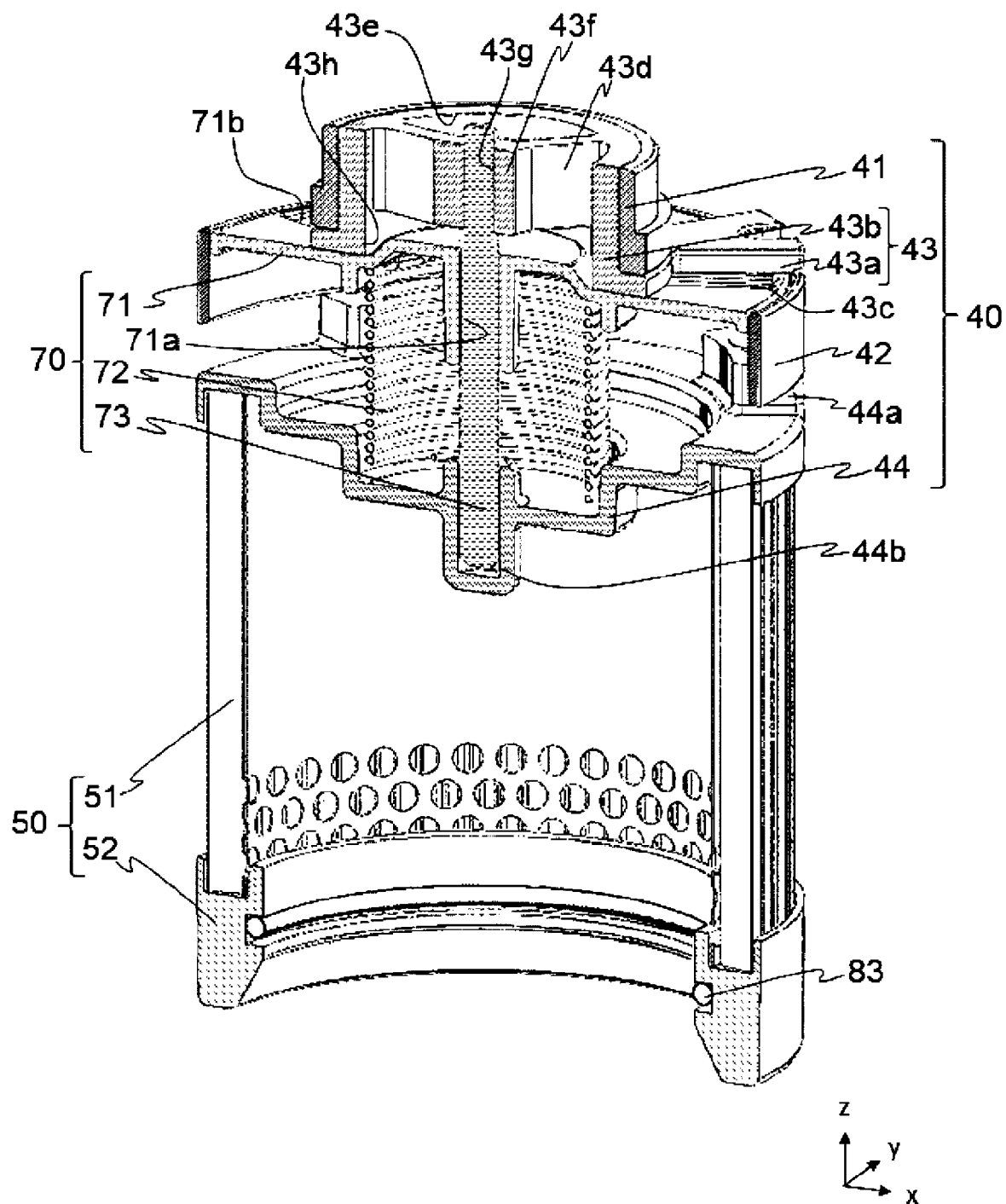
FIG. 5 is a cross-sectional perspective view of the outflow portion 40 and the suction strainer 50.
Figure 6:
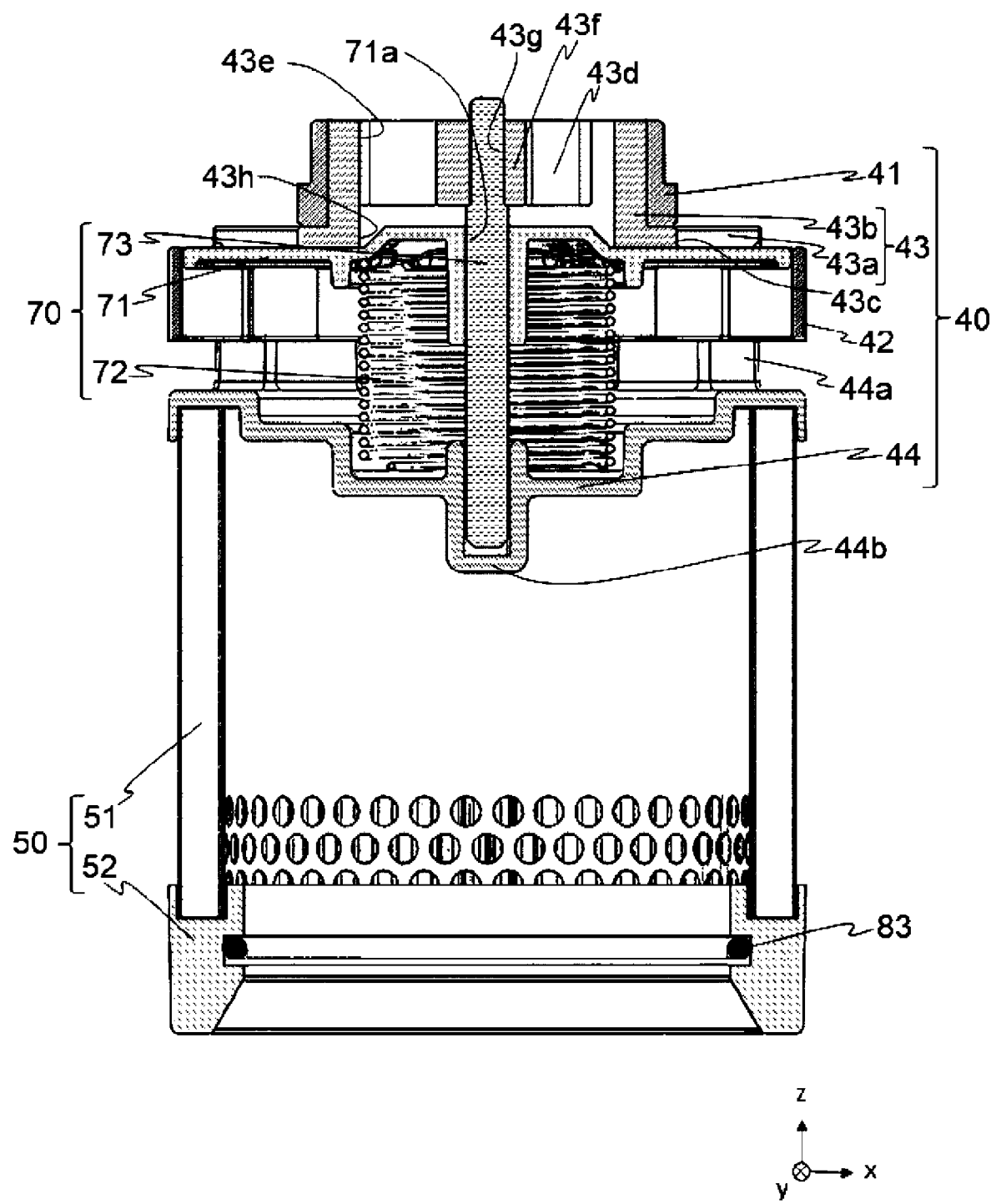
FIG. 6 is a cross-sectional view of the outflow portion 40 and the suction strainer 50.
Figure 7:
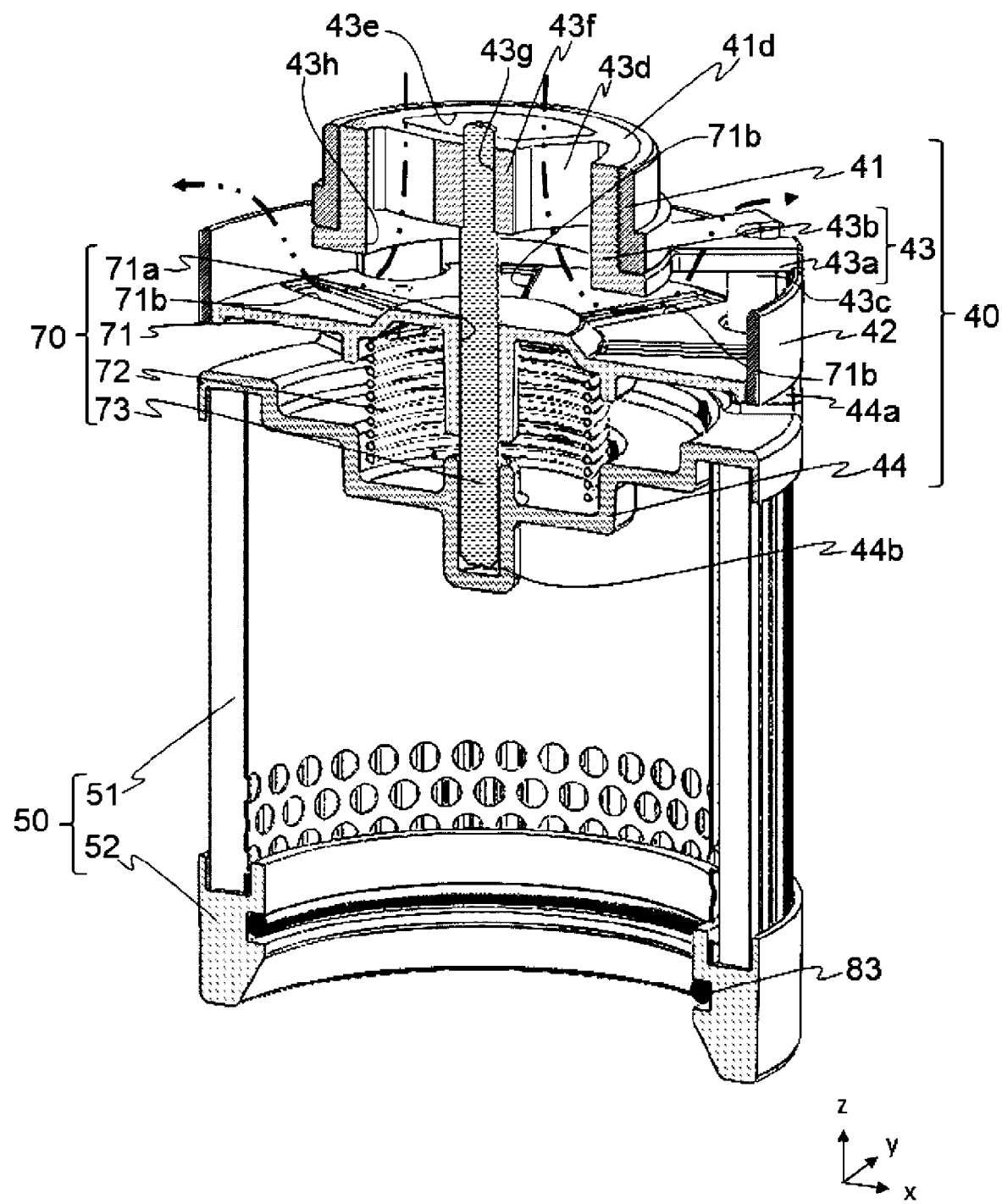
FIG. 7 is a cross-sectional perspective view of the outflow portion 40 and the suction strainer 50.
Figure 8:
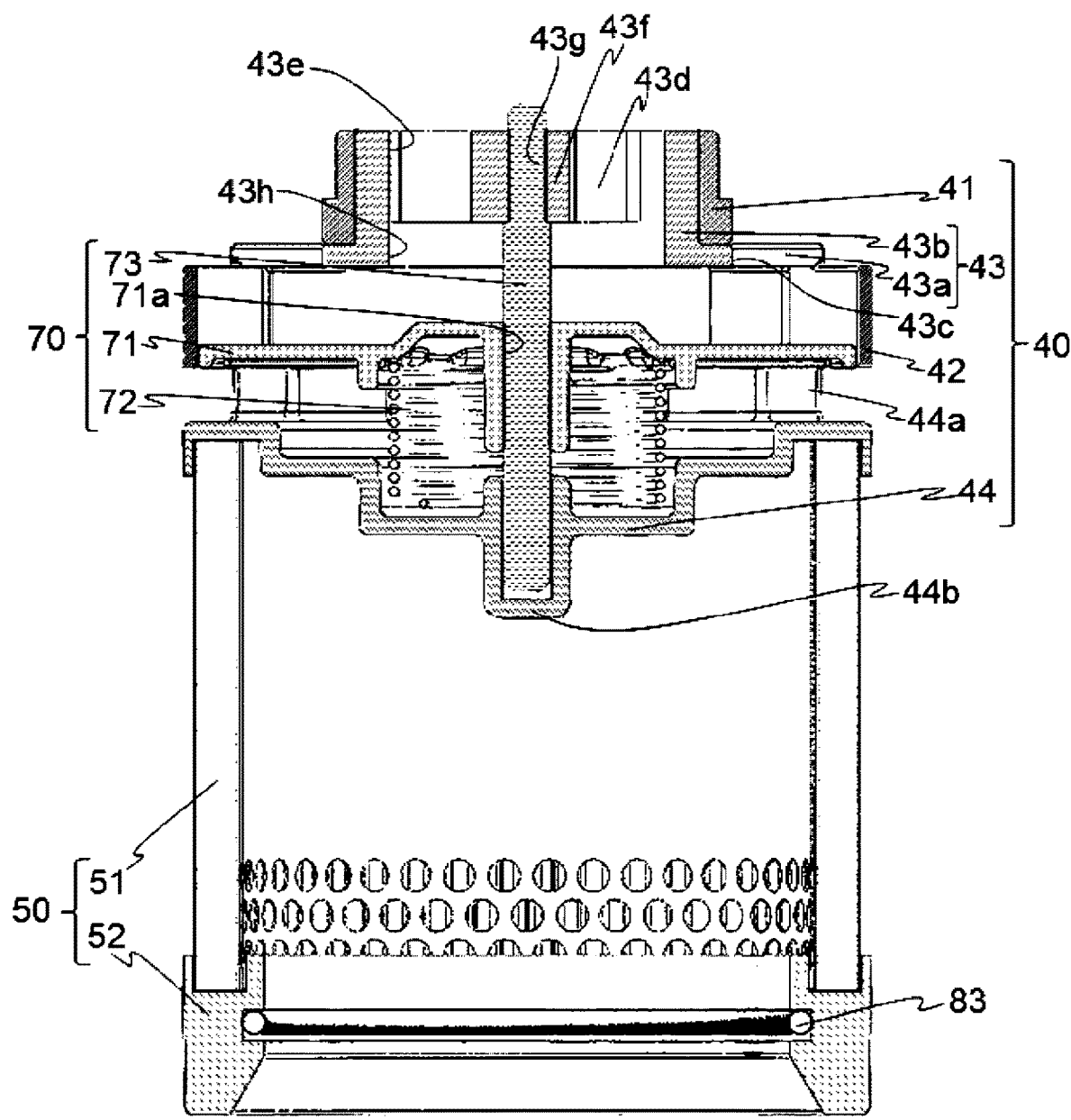
FIG. 8 is a cross-sectional view of the outflow portion 40 and the suction strainer 50.

FIG. 4 is a perspective view of the outflow portion 40 and the suction strainer 50. FIGS. 5 and 7 are cross-sectional perspective views of the outflow portion 40 and the suction strainer 50. FIGS. 6 and 8 are cross-sectional views of the outflow portion 40 and the suction strainer 50. In FIGS. 5 to 8, hatching indicating a cross section is partially omitted.

The outflow portion 40 mainly includes tubular portions 41, 42, a coupling portion 43, and a bottom surface 44 having a substantially plate-like shape. The tubular portions 41, 42 have a substantially tubular shape, and the diameter of the tubular portion 42 is larger than that of the tubular portion 41.

The coupling portion 43 includes an upper surface 43a having a substantially plate-like shape, and a tubular portion 43b provided on the upper surface 43a so as to protrude in the upward direction. An outer peripheral surface of the upper surface 43a is coupled to the tubular portion 42.

The tubular portion 41 is provided at the coupling portion 43 so as to protrude in the upward direction from the upper surface 43a. The tubular portion 43b is inserted and fitted into the tubular portion 41. By the tubular portion 41 and the tubular portion 43b being inserted into the through-hole 14c of the third case 14, the tubular portion 41 and the tubular portion 43b, that is, the outflow portion 40 is mounted on the filter case 10.

An outflow port 43c through which the hydraulic oil flows out of the outflow portion 40 is provided in the upper surface 43a. The outflow port 43c is disposed at a position overlapping with a recessed portion 71b (described in detail later) in a plan view (as viewed from the z direction).

A hole 43e partitioned by a plurality of ribs 43d extending in the radial direction is provided in the tubular portion 43b. Further, a hole 43h communicated with the hole 43e is provided in the upper surface 43a. Hollow portions of the hole 43e and the hole 43h are holes through which the hydraulic oil flowing out of the space S2 flows into the outflow portion 40. A rod-like portion 43f that couples the plurality of ribs 43d is provided substantially in the center of the tubular portion 43b.

The upper surface 43a and the bottom surface 44 are provided so as to be separated from each other. A rib 44a protruding upward is provided on the bottom surface 44, and the upper surface 43a and the bottom surface 44 are integrated by a screw 67 being screwed into a screw hole formed in the upper surface 43a and the rib 44a.

The back pressure valve 70 is provided in a space between the upper surface 43a and the bottom surface 44. The back pressure valve 70 mainly includes a valve body 71 having a substantially plate-like shape, an elastic member 72 provided between the valve body 71 and the bottom surface 44, and a rod-like member 73 provided in the rod-like portion 43f and the bottom surface 44.

FIGS. 5 and 6 illustrate a case in which the valve body 71 is in a closed position, in which the valve body 71 is in contact with the upper surface 43a. FIGS. 7 and 8 illustrate a case in which the valve body 71 is in an open position, in which the valve body 71 is not in contact with the upper surface 43a.

The rod-like member 73 is inserted into a recessed portion 44b provided in the bottom surface 44, and is inserted into a hole 43g formed in the rod-like portion 43f. As a result, the rod-like member 73 is provided so as to extend along the vertical direction (the z direction).

A hole 71a into which the rod-like member 73 is inserted is formed in the center of the valve body 71. The valve body 71 is movable between the closed position and the open position, along the rod-like member 73 in the z direction.

The elastic member 72 pushes the valve body 71 in the upward direction (the +z direction). The elastic member 72 pushes up the valve body 71 until the valve body 71 comes into contact with the upper surface 43a. In other words, the upper surface 43a functions as a valve seat of the back pressure valve 70. In the closed position in which the valve body 71 is in contact with the upper surface 43a, the valve body 71 covers the hole 43h. As the pressure inside the filter case 10 rises, the valve body 71 moves in the downward direction against an urging force from the elastic member 72.

Figure 9:
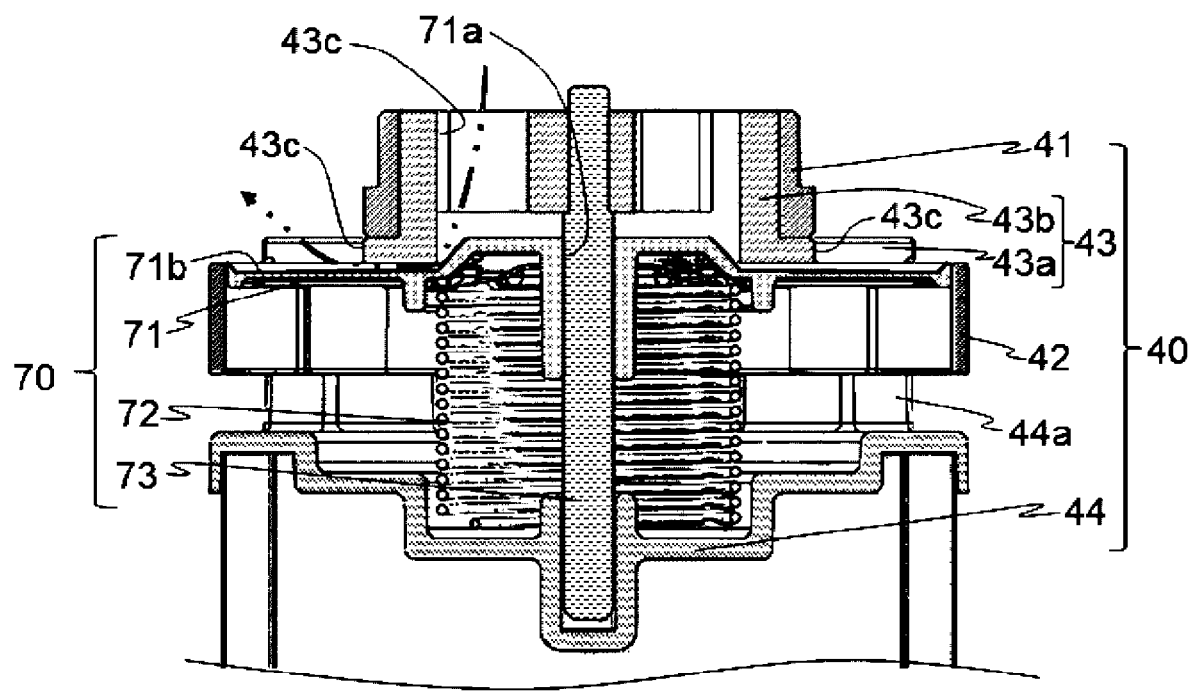
FIG. 9 is a cross-sectional view of the outflow portion 40 and a back pressure valve 70.

A recessed portion 71b is provided in a surface, of the valve body 71, that comes into contact with the upper surface 43a. FIG. 9 is a cross-sectional view of the outflow portion 40 and the back pressure valve 70 when the valve body 71 is in the closed position (the back pressure valve 70 is in a closed state). As a result of the recessed portion 71b being formed in the valve body 71, even when the valve body 71 is in contact with the upper surface 43a, a tiny space is formed between the recessed portion 71b and the upper surface 43a. As a result, the space formed between the recessed portion 71b and the upper surface 43a causes the space (i.e., the space S2) inside the tubular portion 43b to communicate with the space S3, thus allowing the hydraulic oil to pass through between the recessed portion 71b and the upper surface 43a even when the back pressure valve 70 is in the closed state. Further, because the outflow port 43c is disposed at the position overlapping with the recessed portion 71b in a plan view, the hydraulic oil flowing through the space formed between the recessed portion 71b and the upper surface easily flows into the space S3.

The description will now return to FIGS. 4 to 8. The suction strainer 50 includes a filter medium 51 having a substantially tubular shape. The filter medium 51 is a filtration portion through which the hydraulic oil can pass. An opening on the upper side of the filter medium 51 is covered by the bottom surface 44. A mounting member 52 is provided on the lower side of the filter medium 51. The mounting member 52 causes the filter medium 51 to be provided on the bottom surface 102 such that the suction strainer 50 covers the outflow port 102a. A sealing member 83 is provided between the mounting member 52 and the outflow port 102a so as to prevent leakage of the hydraulic oil.

Next, functions of the filter device 1 configured as described above will be described. Two-dot chain line arrows in FIGS. 1, 3, 7 and 9 indicate a flow of the hydraulic oil.

When an operation of an engine of a work machine is stopped, the hydraulic oil is not contained in the filter case 10. Thus, as illustrated in FIG. 1, the back pressure valve 70 is in the closed state, and the space S2 and the space S3 are not communicated with each other via the outflow portion 40.

When the work machine starts driving, as illustrated in FIG. 1, the hydraulic oil starts flowing through the interior of a hydraulic circuit, and accordingly, the hydraulic oil gradually flows into the space S1. Because the interior of the filter case 10 (the spaces S1 and S2) is filled with initial air, as the position of the oil level inside the filter case 10 rises (moves in the +z direction), the initial air is discharged to the space S3 through the air vent holes 39 (the hole 31e (not illustrated in FIG. 1) and the holes 32e).

The hydraulic oil flowing into the space S1 flows from the outside to the inside of the filter medium 21, and the filter medium 21 removes, for example, dust in the hydraulic oil. The hydraulic oil after filtration flows out to the space S2.

While the engine is idling, a flow rate of the hydraulic oil is low, substantially 40 L (liters)/minute. In this case, even though the hydraulic oil gradually flows into the filter case 10 from the inflow portions (not illustrated), because the flow rate of the hydraulic oil is low and the pressure inside the filter case 10 is not sufficiently high, the back pressure valve 70 is in the closed state, as illustrated in FIG. 1. As a result, the oil level rises to the position of an oil level L indicated by a dotted line. Note that because the back pressure valve 70 is in the closed state during idling, the hydraulic oil after filtration passes through the space between the recessed portion 71b and the upper surface 43a and flows into the space S3.

When the engine starts operating, the flow rate of the hydraulic oil increases, and the flow rate increases up to substantially 1000 L (liters)/minute. In this case, the hydraulic oil flows into the filter case 10 from the inflow portions (not illustrated), the interior of the filter case 10 is filled with the hydraulic oil, and the pressure inside the filter case 10 becomes sufficiently high. Thus, as illustrated in FIG. 7, the hydraulic oil pushes down the valve body 71 against the urging force from the elastic member 72, and the back pressure valve 70 is brought into an open state. As a result, the hydraulic oil after filtration passes through the outflow portion 40 and flows out to the space S3.

Further, when the interior of the filter case 10 is filled with the hydraulic oil while the engine is operating, some of the hydraulic oil passes through the air vent holes 39 (the hole 31e and the holes 32e) and flows out to the space S3. Because the upper end portion 10a of the filter case 10 is narrowed, the hydraulic oil that has passed through the air vent holes 39 does not fall directly toward the hydraulic oil stored in the tank 100, and is stored in the tank 100 via the tubular portion 13b and the small diameter portion 12a (see the two-dot chain line arrow in FIG. 3). As a result, it is possible to prevent air bubbles from being generated in the liquid stored in the tank. However, because the air is likely to be accumulated in an upper portion of the filter case 10 in reality, there is a low possibility that the hydraulic oil flows out of the air vent holes 39.

The hydraulic oil that has flowed out to the space S3 flows out to the outside of the tank 100 from the outflow port 102a via the suction strainer 50.

When the engine is stopped, the air flows from the space S3 into the spaces S1 and S2 through the air vent holes 39. Further, as illustrated in FIG. 9, the hydraulic oil after filtration flows out to the space S3 through a space between the recessed portion 71b and the upper surface 43a. As a result, the oil level gradually drops without removing the lid main body 32 from the mounting portion 31 (synonymous with the filter case 10). Thus, when a certain time period (e.g., approximately five minutes) elapses after the work machine is stopped, the oil level drops below the plate 25 without removing the lid main body 32 from the mounting portion 31 (the filter case 10).

When the lid main body 32 of the lid body 30 is removed from the mounting portion 31, the filter element 20 can be extracted from the open end of the upper portion of the filter case 10. Because the oil level drops below the plate 25 when the certain time period elapses after the work machine is stopped, the filter element 20 is not immersed in the hydraulic oil, and the used filter element 20 in a state from which the oil is drained can be extracted. As a result, it is possible to prevent the hydraulic oil from dripping to the outside of the filter device 1.

Further, even when the lid main body 32 is removed from the mounting portion 31 when replacing the filter element 20, maintenance is easy because the differential pressure sensor 62 remains mounted on the filter case 10 side.

According to the present embodiment, by providing the recessed portion 71b in the valve body 71, when the engine is stopped, the hydraulic oil in the filter case 10 flows out to the space S3 through the space between the recessed portion 71b and the upper surface 43a, and the air flows from the space S3 into the spaces S1 and S2 through the holes 32e. Thus, without removing the lid main body 32 from the mounting portion 31 (synonymous with the filter case 10), the oil of the filter element 20 can be drained. Thus, it is possible to prevent the hydraulic oil from dripping to the outside of the filter device 1 (to prevent oil dripping from occurring) at the time of the replacement.

Because the air vent holes (the holes 31e, 32e) and the recessed portion 71b are not formed in a known return filter, the oil does not flow out of the filter case 10 even when the operation of the work machine is stopped, and the oil level drops only when the lid body 30 is removed during the replacement operation. Thus, oil dripping may occur at the time of replacing the filter element 20. In contrast, in the present embodiment, before starting the replacement operation, the hydraulic oil can be discharged from the filter case 10. Thus, the oil can be drained from the filter element 20 before starting the replacement operation, and it is thus possible to prevent the oil from dripping.

Further, according to the present embodiment, because the back pressure valve 70 is in the closed state during idling, and the back pressure valve 70 is brought into the open state only when the engine starts operating, the air inside the filter case 10 is not discharged from the outflow portion 40. Thus, this can prevent the air bubbles from being generated in the hydraulic oil stored in the tank 100.

When the air bubbles are contained in the hydraulic oil stored in the tank 100, the air bubbles pass through the suction strainer 50 and flow into a pump. As a result, erosion may occur and a lifespan of the pump may be shortened. In the present embodiment, because the air in the filter case 10 is discharged via the air vent holes, it is possible to prevent the erosion, or the like from occurring.

Further, according to the present embodiment, during idling when the flow rate of the hydraulic oil is low, the air does not flow into the filter case 10 via the air vent holes, and thus stable driving can be achieved.

Further, according to the present embodiment, because the opening on the upper side of the filter medium 51 is covered by the bottom surface 44 of the outflow portion 40, it is possible to shorten the total length of the filter device 1, which is obtained by integrating the return filter and the suction strainer.

Note that in the present embodiment, the air vent holes (the holes 31e, 32e) cause the space S2 to communicate with the space S3, but the air vent holes need not necessarily cause the space S2 to communicate with the space S3. For example, the air vent holes may cause a space inside the filter case 10 to communicate with the space outside the filter case 10. In this case also, when the work machine is stopped, the air can be caused to flow into the interior of the filter case 10 through the air vent holes. However, when the hydraulic oil has passed through the air vent holes, in order to return the hydraulic oil to the tank 100, it is preferable that both the ends be open to the surface, on the lower side, of the lid body 30, and the air vent holes cause the space S2 to communicate with the space S3.

Further, in the present embodiment, the differential pressure sensor 62 is provided at the protrusion portion 31a, but various sensors other than the differential pressure sensor 62 can be mounted on the protrusion portion 31a. For example, by providing a temperature sensor at the protrusion portion 31a, the temperature inside the space S2 can be measured.

Further, in the present embodiment, the upper surface 43a and the valve body 71 have the flat plate shape substantially along the horizontal plane, but the shape of the upper surface 43a and the valve body 71 is not limited thereto. For example, the upper surface 43a may have a side surface portion having a shape like a side surface of a truncated cone, or the valve body 71 may have the shape like the side surface of the truncated cone.

Second Embodiment

Figure 10:
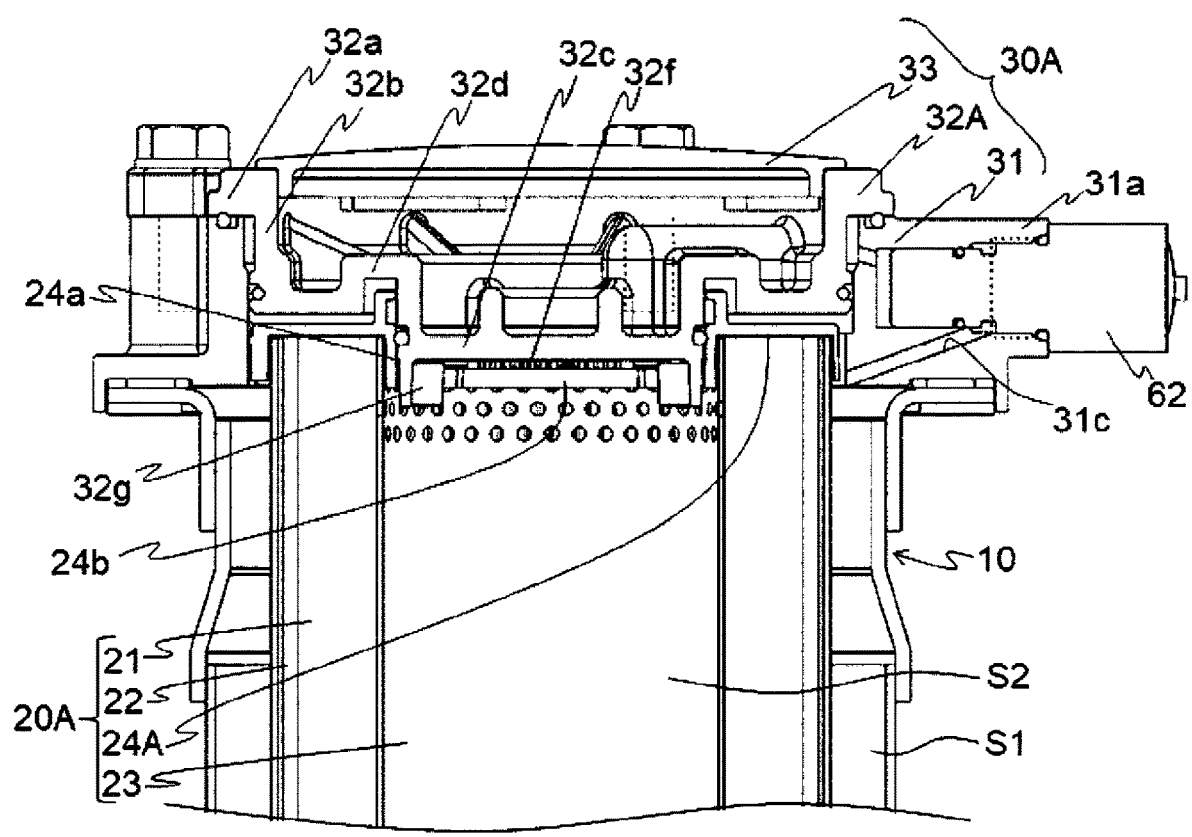
FIG. 10 is a cross-sectional view schematically illustrating a filter device 2 according to an embodiment of the present invention.

FIG. 10 is a cross-sectional view schematically illustrating a filter device 2 according to an embodiment of the present invention. In FIG. 10, hatching indicating a cross section is omitted. Note that the same components as those in the first embodiment are denoted by the same reference numerals, and descriptions thereof will be omitted.

The filter device 2 mainly includes the filter case 10, a filter element 20A, a lid body 30A, the outflow portion 40 (see FIG. 1), the suction strainer 50 (see FIG. 1), and the back pressure valve 70 (see FIG. 1).

The filter element 20A mainly includes the filter medium 21, the outer tube 22, the inner tube 23, a plate 24A, and the plate 25 (not illustrated). The lid body 30A mainly includes the mounting portion 31, a lid main body 32A, and the cover 33.

The plate 24A is provided at the upper ends of the filter medium 21, the outer tube 22, and the inner tube 23, and is in contact with the lid body 30A.

Figure 11:
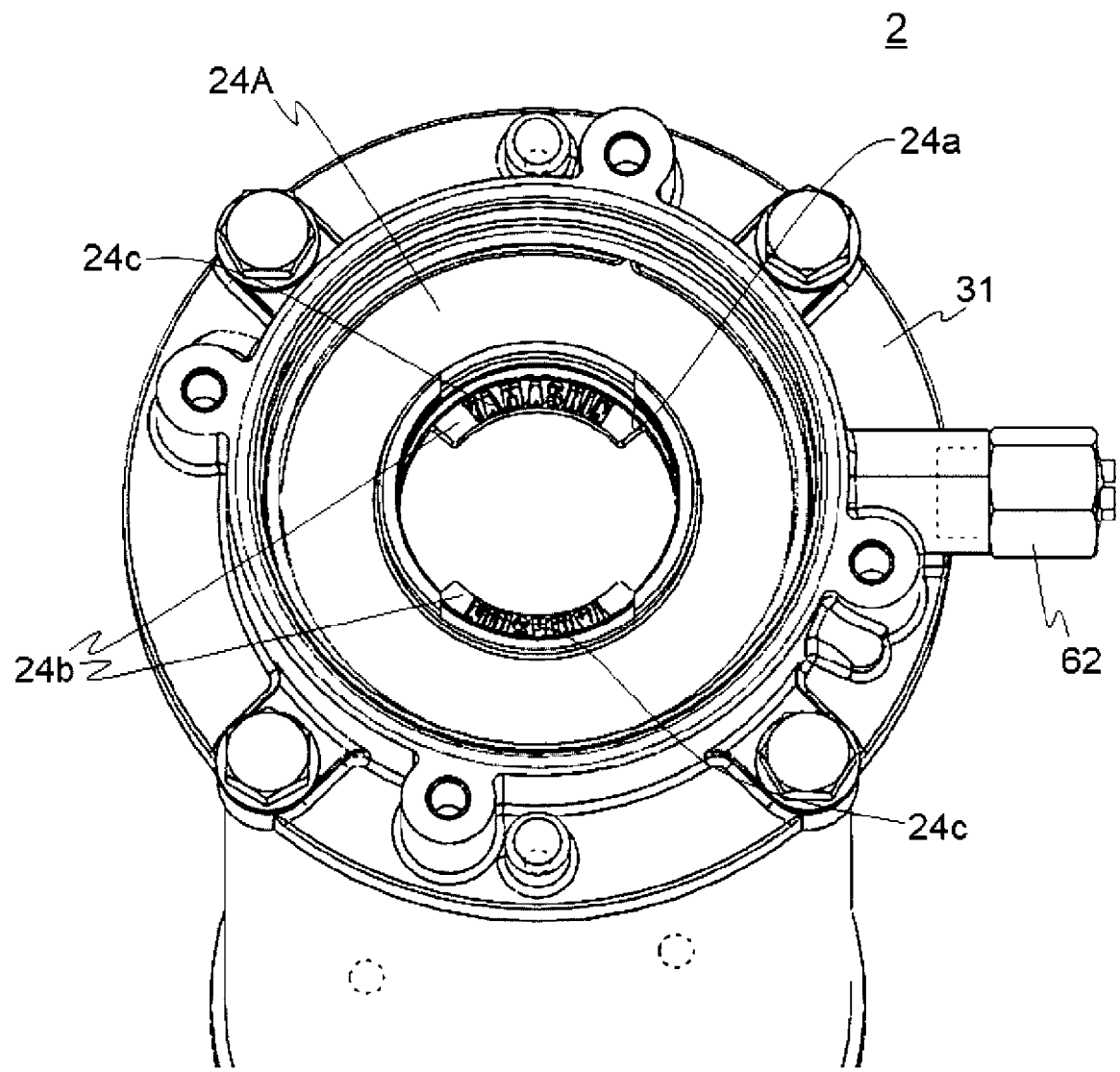
FIG. 11 is a perspective view of the filter device 2 when a lid main body 32A and a cover 33 are removed.

FIG. 11 is a perspective view of the filter device 2 when the lid main body 32A and the cover 33 are removed. The plate 24A includes a tubular portion 24a having a substantially tubular shape and disposed adjacent to the inner side of the filter medium 21 and the inner tube 23. Projection portions 24b protruding inward in the radial direction are provided at the tubular portion 24a, and a plurality of holes 24c are provided in the projection portions 24b.

The description will now return to FIG. 10. The lid main body 32A is a member having a substantially thick plate-like shape, and is provided so as to cover the hollow portion of the mounting portion 31 from the upper side of the mounting portion 31. The lid main body 32A mainly includes the flange portion 32a, the first tubular portion 32b, the second tubular portion 32c, the plate-like portion 32d, and ribs 32g and projection portions 32f provided at the second tubular portion 32c. The ribs 32g and the projection portions 32f are provided on a lower surface of the second tubular portion 32c so as to protrude downward (in the −z direction).

Figure 12:
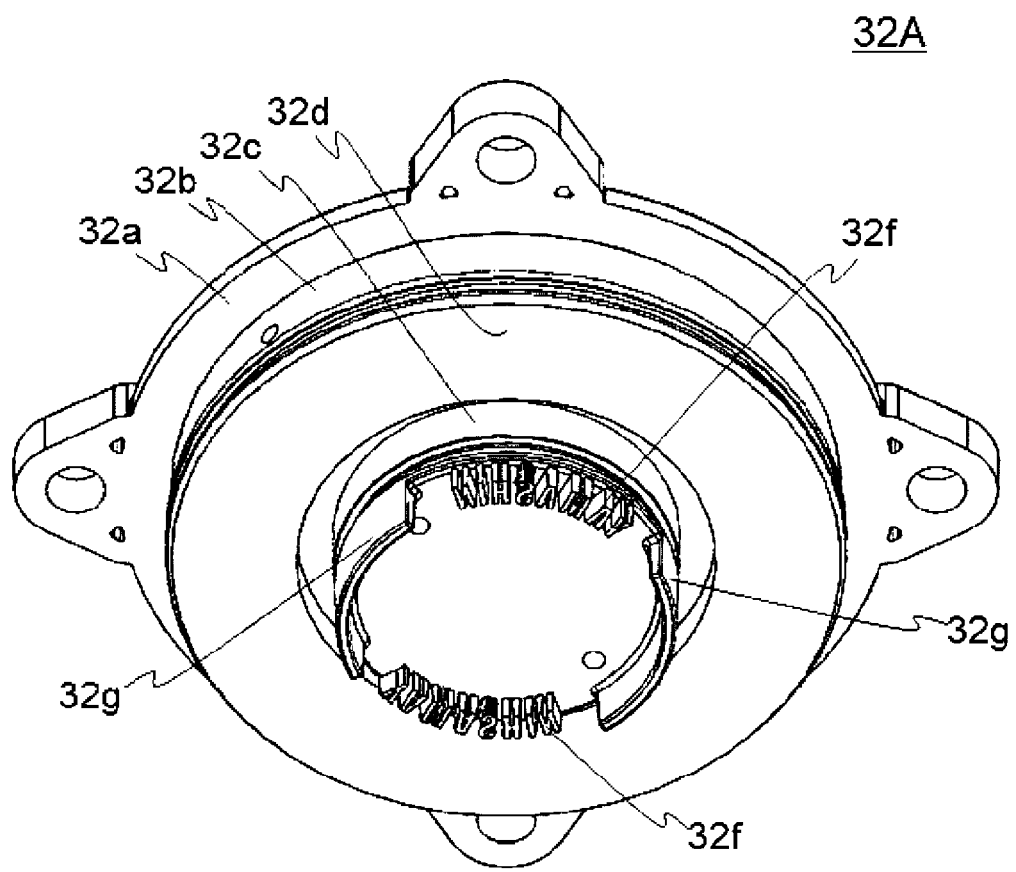
FIG. 12 is a perspective view of the lid main body 32A as viewed from the lower side.

FIG. 12 is a perspective view of the lid main body 32A as viewed from the lower side. The rib 32g is a rib having a substantially circular arc shape in a plan view. The projection portion 32f has a shape representing a character, for example. In the present embodiment, there are 16 pieces (8 pieces×2 sets) of the projection portions 32f, and the projection portions 32f include, for example, shapes representing the characters of "Y", "A", "M", "S", "H", "I", and "N", or mirror images thereof.

The projection portions 32f are inserted into the holes 24c formed in the projection portions 24b. In other words, the projection portions 32f and the holes 24c have corresponding shapes. In the present embodiment, the holes 24c have shapes including the characters of "Y", "A", "M", "S", "H", "I", and "N", or the mirror images thereof.

Note that the shapes of the projection portions 32f illustrated in FIG. 12 are an example, and the shapes are not limited thereto. The plurality of holes 24c and the projection portions 32f may respectively be shapes each representing at least one of a character, a symbol, and a pattern, and shapes representing the mirror images thereof. For example, the holes 24c and the projection portions 32f may respectively be characters, shapes, and the like representing a company name or a registered trademark of a company manufacturing or selling the filter element 20 or a hydraulic actuator into which the filter element 20 is incorporated, and the mirror images thereof.

Further, the positions and numbers of the projection portions 24b, the holes 24c, the projection portions 32f, and the like are not limited to this example. Further, the ribs 32g are not necessarily formed.

The description will now return to FIG. 10. After replacing the filter element 20A, the new filter element 20A is inserted into the filter case 10, and then, the lid main body 32A is mounted on the filter case 10 and the filter element 20A. At this time, the ribs 32g are inserted between the projection portions 24b so as to be disposed along the tubular portion 24a. Further, the projection portions 32f are inserted into the corresponding holes 24c, respectively.

According to the present embodiment, it is possible to prevent a filter element other than the filter element 20A that is a genuine product from being used.

Third Embodiment

A filter device according to a third embodiment differs from the filter device 1 according to the first embodiment, in the shapes of the outflow portion and the back pressure valve. A filter device 3 according to the third embodiment mainly includes the filter case 10 (see FIG. 1), the filter element 20 (see FIG. 1), the lid body 30 (see FIG. 1), an outflow portion 40A, the suction strainer 50, and a back pressure valve 70A. Note that the same components as those in the first embodiment are denoted by the same reference numerals, and descriptions thereof will be omitted.

Figure 13:
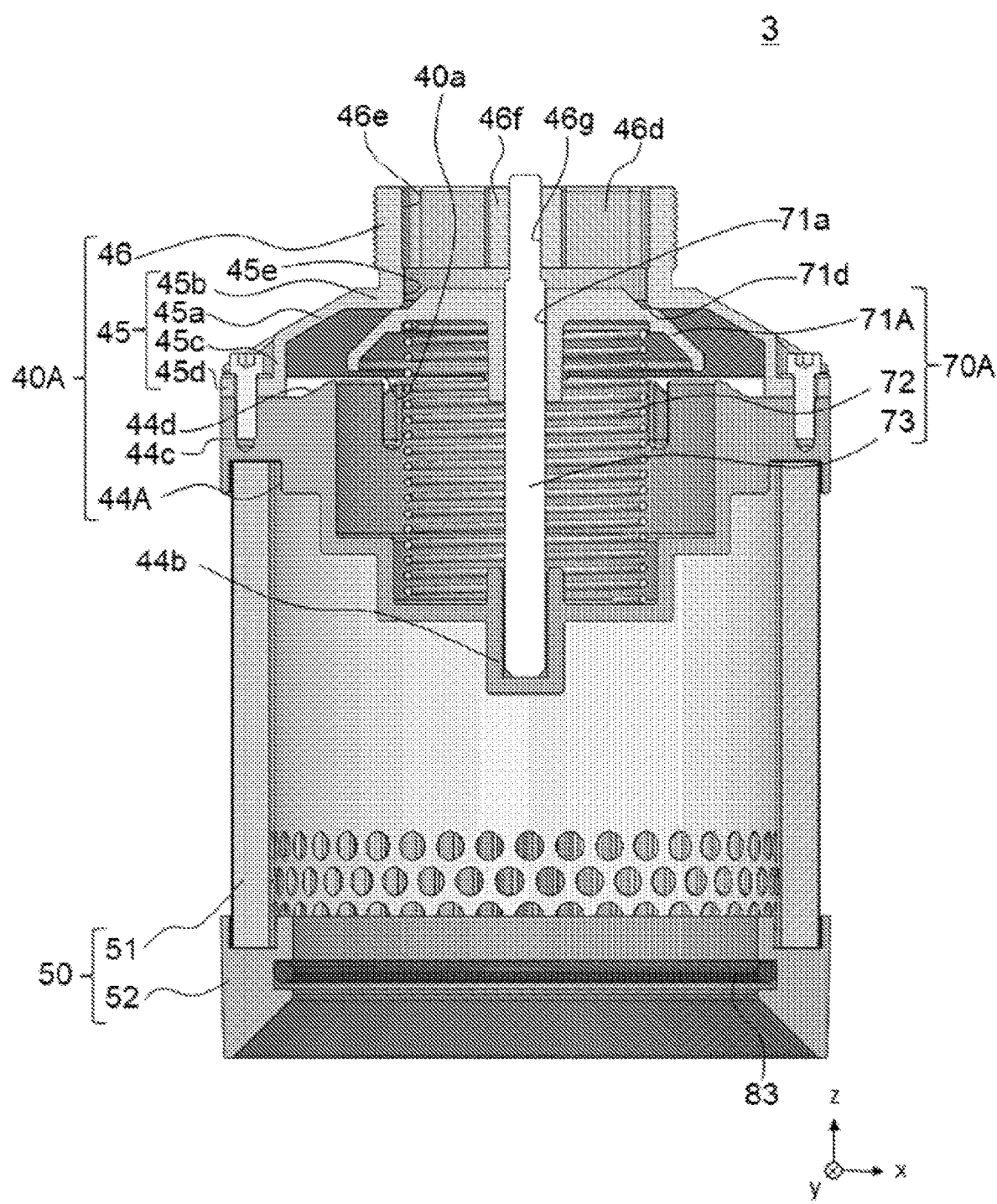
FIG. 13 is a cross-sectional view schematically illustrating an outflow portion 40A, the suction strainer 50, and a back pressure valve 70A.
Figure 14:
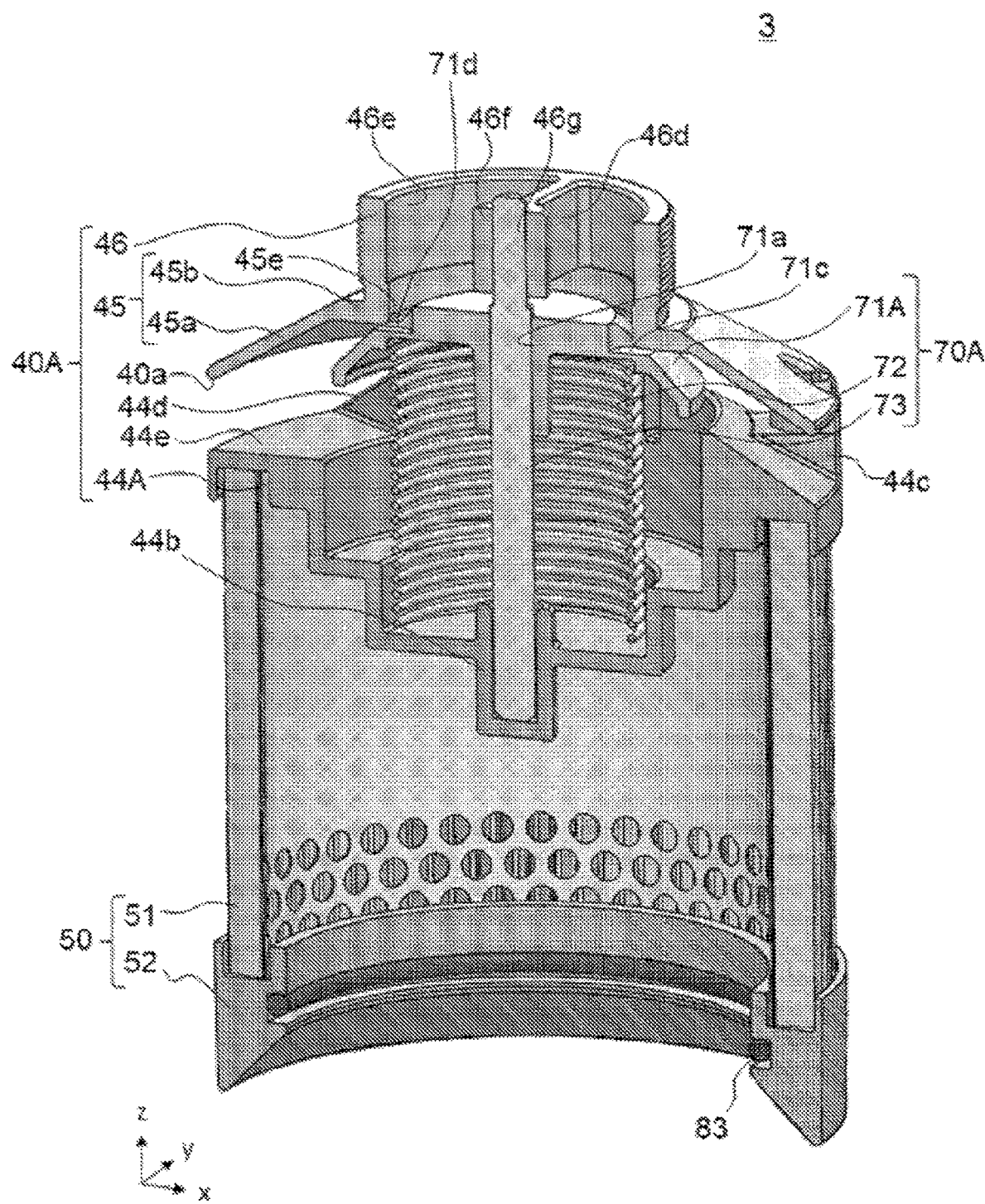
FIG. 14 is a cross-sectional view schematically illustrating the outflow portion 40A, the suction strainer 50, and the back pressure valve 70A.
Figure 15:
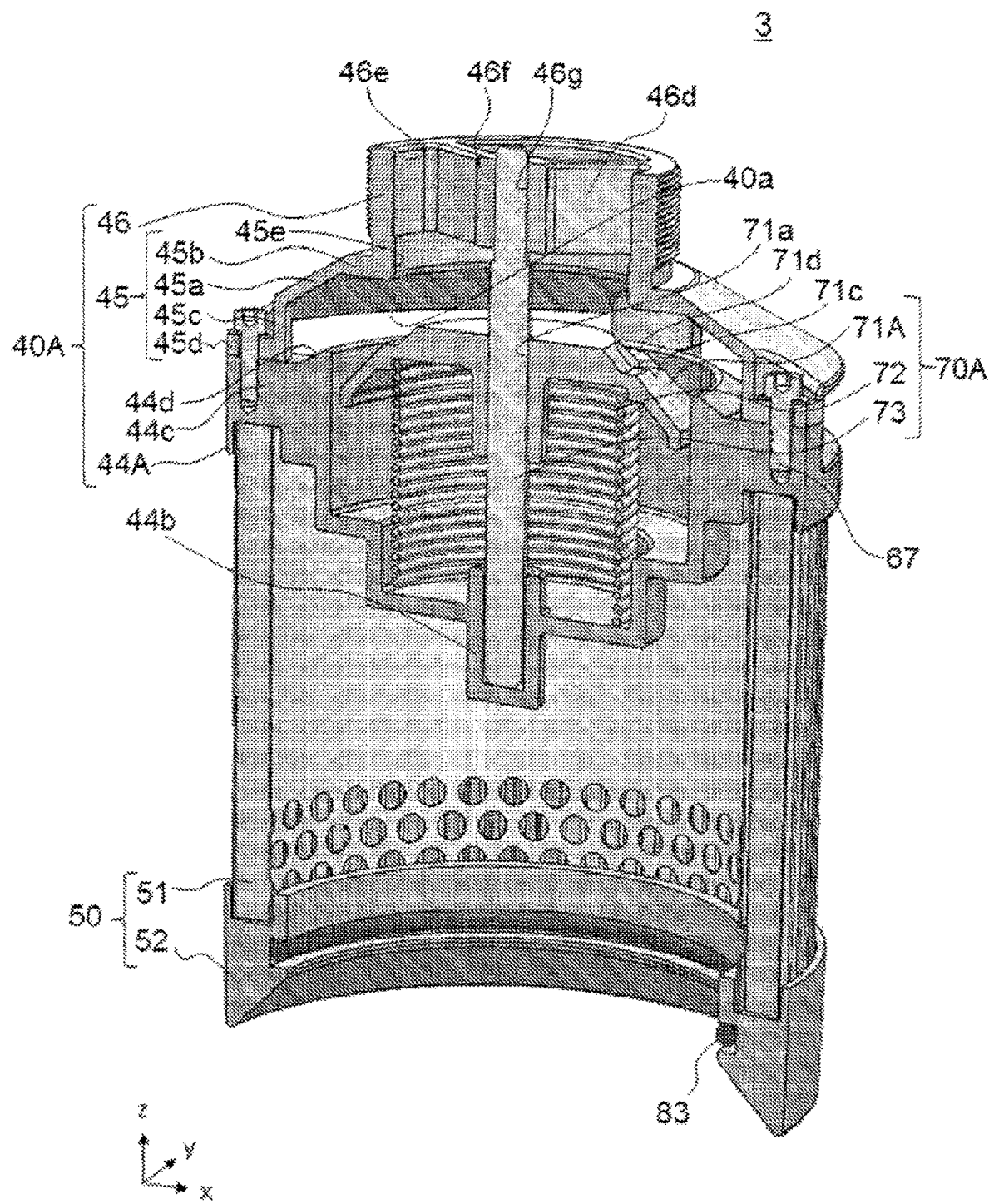
FIG. 15 is a cross-sectional view schematically illustrating the outflow portion 40A, the suction strainer 50, and the back pressure valve 70A.

FIGS. 13 to 15 are cross-sectional views schematically illustrating the outflow portion 40A, the suction strainer 50, and the back pressure valve 70A in the filter device 3. FIGS. 13 and 14 illustrate a case in which the back pressure valve 70A is in a closed position. FIG. 15 illustrates a case in which the back pressure valve 70A is in an open position.

The outflow portion 40A causes the space inside the filter element 20 to communicate with the space outside the filter case 10, and mainly includes a bottom surface 44A, an upper surface 45, and a tubular portion 46.

The upper surface 45 is a member having a substantially plate-like shape, and includes a side surface portion 45a having a shape like a side surface of a truncated cone. The side surface portion 45a has a wide opening on the lower side and a narrow opening on the upper side. A flat surface portion 45b is provided at the upper end of the side surface portion 45a. Further, a recessed portion 45c is provided in a lower end portion of the side surface portion 45a.

The tubular portion 46 has a substantially tubular shape and is provided so as to protrude in the upward direction from the upper surface 45. As a result of the tubular portion 46 being mounted in the through-hole 14c formed in the filter case 10, the outflow portion 40A is provided in the filter case 10.

A hole 46e partitioned by a plurality of ribs 46d extending in the radial direction is provided in the tubular portion 46. Further, a hole 45e communicated with the hole 46e is provided in the upper surface 45. The hole 45e and the hole 46e are holes through which the hydraulic oil flowing out of the space S2 (see FIG. 1) flows into the outflow portion 40A. A rod-like portion 46f that couples the plurality of ribs 46d is provided substantially in the center of the tubular portion 46.

The bottom surface 44A is a member having a substantially plate-like shape, and the recessed portion 44b is provided in the center thereof. A rib 44c protruding upward is provided on the bottom surface 44A. Further, an inclined surface 44d protruding in the upward direction is provided at the upper end (a surface facing the upper surface 45) of the bottom surface 44A. The inclined surface 44d is partially notched to form a recessed portion 44e. A bottom surface of the recessed portion 44e is substantially horizontal.

By inserting the screw 67 into a hole formed in a bottom surface 45d of the recessed portion 45c and screwing the screw 67 into a cavity formed in the rib 44c, the bottom surface 44A and the upper surface 45 are integrated. The bottom surface 44A and the upper surface 45 are provided to be separated from each other. A side surface of the outflow portion 40A has an opening between the bottom surface 44A and the upper surface 45, and this opening is an outflow port 40a through which the hydraulic oil flows out from the outflow portion 40A.

Figure 16:
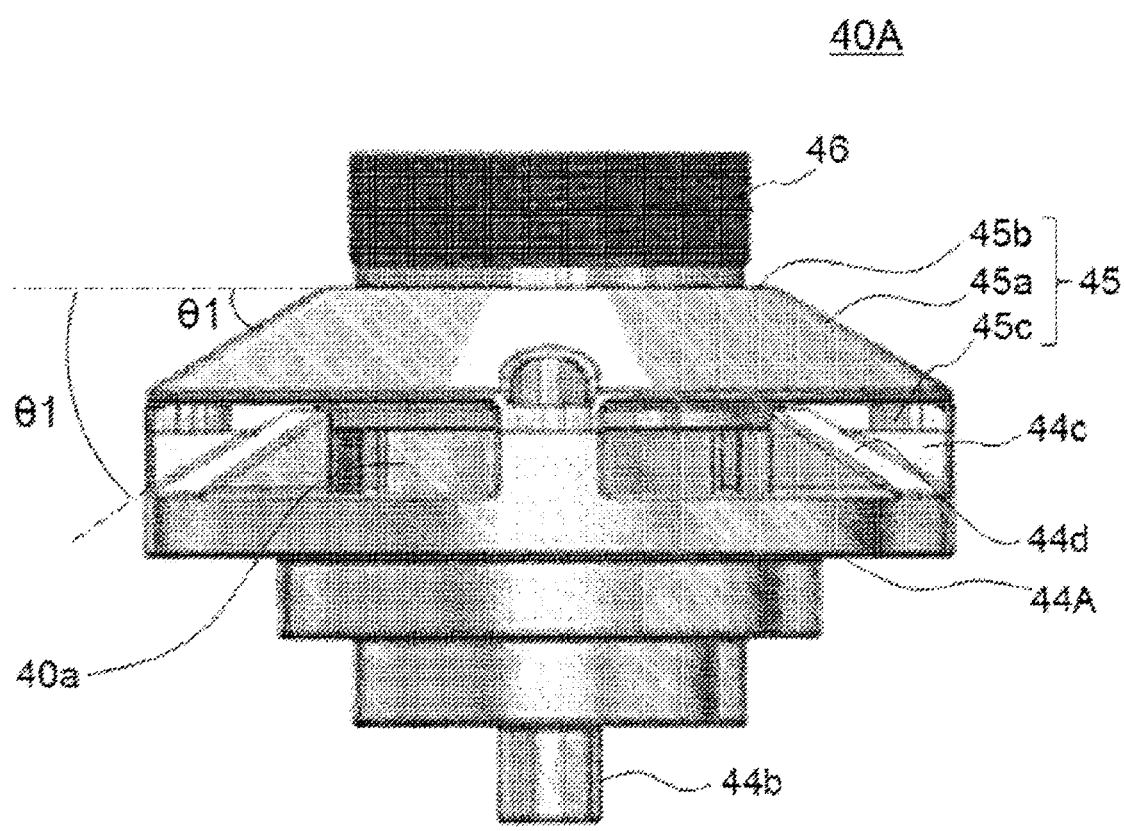
FIG. 16 is a side view schematically illustrating the outflow portion 40A.

FIG. 16 is a side view schematically illustrating the outflow portion 40A. An angle θ1 formed between the side surface portion 45a and the horizontal plane (the flat surface portion 45b) is approximately 30 degrees. Similarly, the angle θ1 formed between the inclined surface 44d and the flat surface portion 45b is approximately 30 degrees. In other words, the inclined surface 44d and the side surface portion 45a are substantially parallel with each other. Note that it is sufficient that the angle θ1 be approximately 30 degrees or greater, and the angle θ1 may be approximately 45 degrees, for example.

Figure 17:
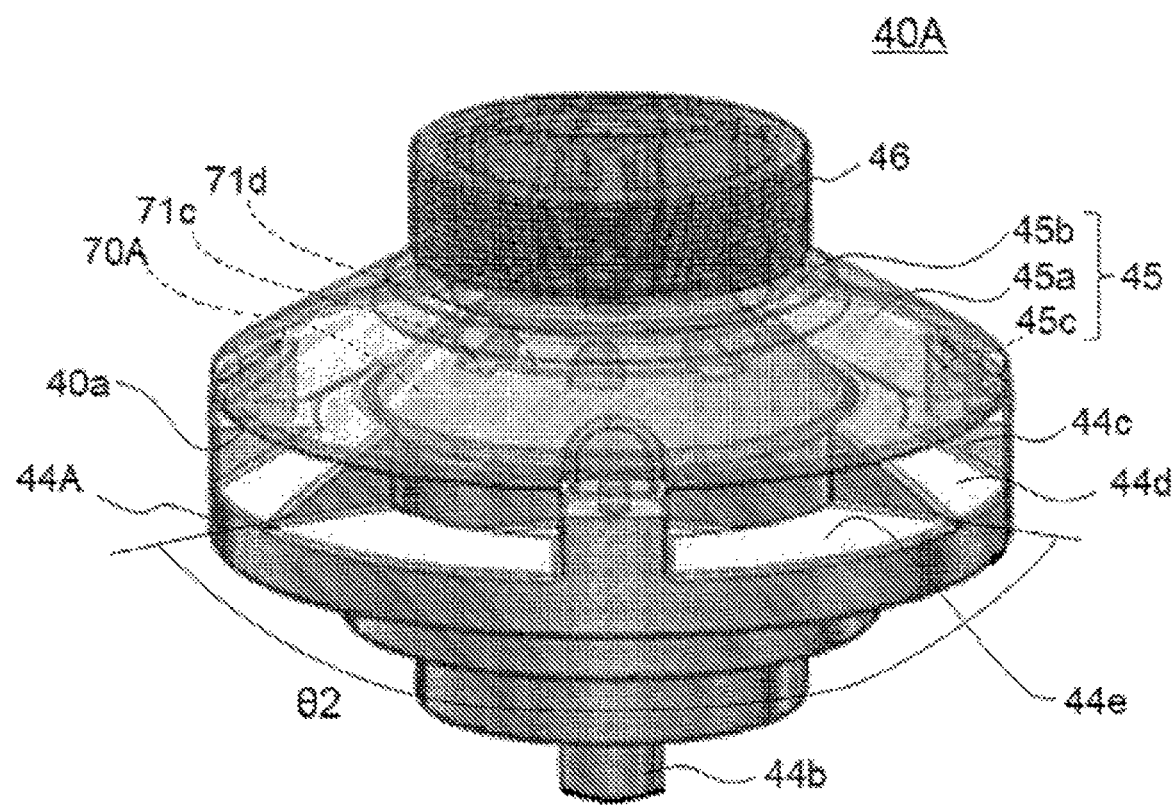
FIG. 17 is a perspective view schematically illustrating the outflow portion 40A, and is a diagram illustrating the main portions thereof in a see-through manner.

FIG. 17 is a perspective view schematically illustrating the outflow portion 40A, and is a diagram illustrating the main portions thereof in a see-through manner. The inclined surfaces 44d are provided evenly in the circumferential direction. The recessed portion 44e is formed between the adjacent inclined surfaces 44d, and the recessed portion 44e has a substantially annular fan-shape in a plan view. In the present embodiment, the bottom surface 44A has three of the inclined surfaces 44d, and a central angle θ2 is approximately 120 degrees.

Note that the number of the inclined surfaces 44d and the angle of the central angle θ2 are not limited to this example. Further, although the recessed portion 44e is not necessarily formed, the bottom surface 44A preferably includes the recessed portion 44e.

The description will now return to FIGS. 13 to 15. The back pressure valve 70A is provided in the outflow portion 40A (in other words, in a space between the upper surface 44A and the upper surface 45). The back pressure valve 70A mainly includes a valve body 71A having a substantially plate-like shape, the elastic member 72 provided between the valve body 71A and the bottom surface 44A, and the rod-like member 73 provided in the rod-like portion 46f and the bottom surface 44A.

The rod-like member 73 is inserted into the recessed portion 44b provided in the bottom surface 44A, and is inserted into a hole 46g formed in the rod-like portion 46f. Further, the hole 71a into which the rod-like member 73 is inserted is formed in the center of the valve body 71A. As a result, the rod-like member 73 is provided so as to extend along the vertical direction (the z direction).

The elastic member 72 pushes the valve body 71A in the upward direction (the z direction) until the valve body 71A comes into contact with the upper surface 45. In other words, the upper surface 45 functions as a valve seat of the back pressure valve 70A. In the closed position in which the valve body 71A is in contact with the upper surface 45, the valve body 71A covers the hole 45e. As the pressure inside the filter case 10 rises, the valve body 71A moves in the downward direction against the urging force of the elastic member 72. The valve body 71A is movable along the rod-like member 73 in the z direction, between the closed position in which the valve body 71A is in contact with the upper surface 45, and the open position in which the valve body 71A is not in contact with the upper surface 45.

A flat surface portion 71d is provided on the upper side of the valve body 71A. Thus, when the back pressure valve 70A is in a closed state, the upper surface 45 and the flat surface portion 71d come into contact with each other.

Further, a recessed portion 71c is provided in a surface, of the valve body 71A, that comes into contact with the upper surface 45, that is, the flat surface portion 71d. As illustrated in FIG. 14, even when the back pressure valve 70A is in the closed state, by the recessed portion 71c being formed in the valve body 71A, even when the valve body 71A is in contact with the upper surface 45, a tiny space is formed between the recessed portion 71c and the upper surface 45 (the flat surface portion 45b). As a result, the space formed between the recessed portion 71c and the upper surface 45 causes the hole 46e (in other words, the space inside the filter element 20) to communicate with the space between the bottom surface 44A and the upper surface 45 (in other words, the space outside the filter case 10).

Figure 18:
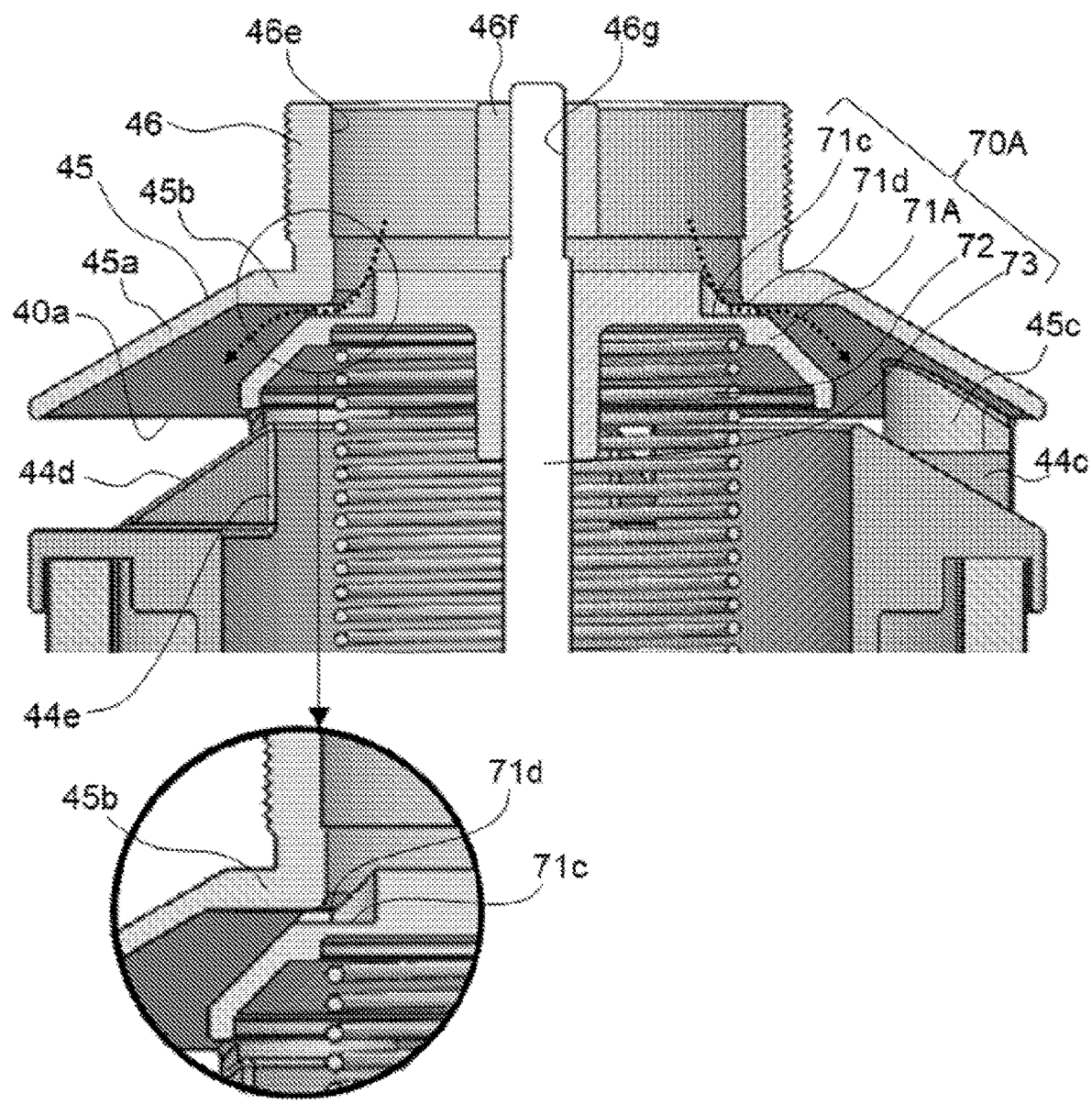
FIG. 18 is a diagram illustrating a flow of hydraulic oil while an engine is idling.

FIG. 18 is a diagram illustrating the flow of the hydraulic oil while the engine is idling. In FIG. 18, dotted line arrows indicate the flow of the hydraulic oil. While the engine is idling, the flow rate of the hydraulic oil is low, substantially 40 L (liters)/minute. In this case, even though the hydraulic oil gradually flows into the filter case 10 from the inflow portions (not illustrated), because the flow rate of the hydraulic oil is low and the pressure inside the filter case 10 is not sufficiently high, the back pressure valve 70A is in the closed state. When the back pressure valve 70A is in the closed state, because the upper surface 45 (the flat surface portion 45b) is in contact with the flat surface portion 71d, a gap is present between the upper surface 45 and the recessed portion 71c. Thus, the hydraulic oil after filtration passes through the space between the upper surface 45 and the recessed portion 71c and flows out from the outflow port 40a.

When the engine starts operating, the flow rate of the hydraulic oil increases, and the flow rate increases up to substantially 1000 L (liters)/minute. In this case, the hydraulic oil flows into the filter case 10 (see FIGS. 1 and 2) from the inflow portions (not illustrated), the interior of the filter case 10 is filled with the hydraulic oil, and the pressure inside the filter case 10 becomes sufficiently high. Thus, the hydraulic oil pushes down the valve body 71A against the urging force of the elastic member 72, and the back pressure valve 70A is brought into an open state.

Figure 19:
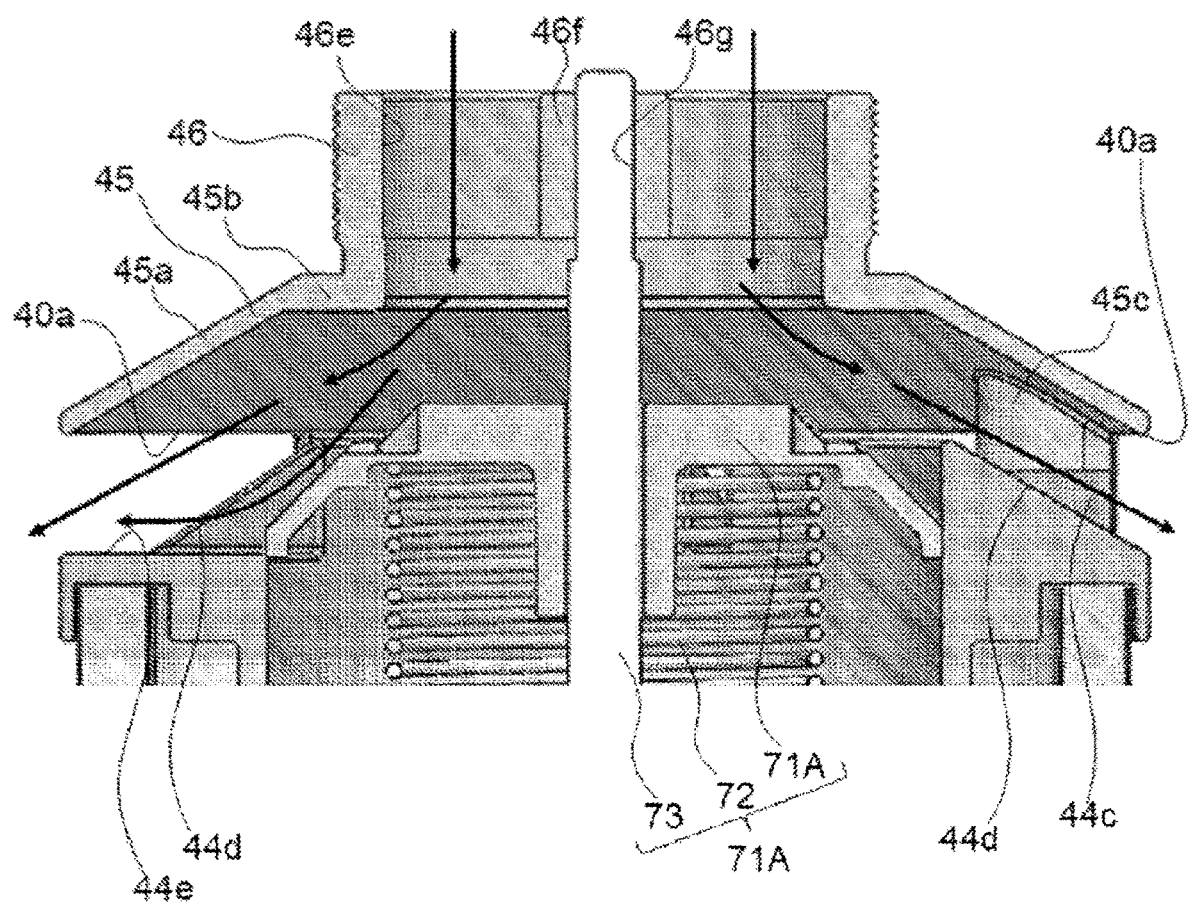
FIG. 19 is a diagram illustrating the flow of the hydraulic oil when the engine is operating.

FIG. 19 is a diagram illustrating the flow of the hydraulic oil when the engine is operating. In FIG. 19, solid line arrows indicate the flow of the hydraulic oil. Because the valve body 71A is separated from the upper surface 45, the hydraulic oil that has passed through the hole 46e and flowed into the hollow portion of the tubular portion 46 flows diagonally downward along the side surface portion 45a, and flows out from the outflow port 40a. Further, because the inclined surface 44d is substantially parallel with the side surface portion 45a, the hydraulic oil flows diagonally downward along the inclined surface 44d.

The inclined surface 44d is partially notched to form the recessed portion 44e. Therefore, the volume between the bottom surface 44A and the upper surface 45 can be increased, and it is thus possible to increase the flow rate of the hydraulic oil flowing between the bottom surface 44A and the upper surface 45. Thus, even when the engine starts operating, thereby causing a large amount of the hydraulic oil to flow, the flow of the hydraulic oil is not hindered.

When the engine is stopped, the back pressure valve 70A returns to the closed state, as illustrated in FIG. 18. Because the recessed portion 71c is formed in the valve body 71A, the hydraulic oil in the filter case 10 flows out to the space S3 (see FIG. 1) through a space between the recessed portion 71c and the upper surface 45, and the air flows from the space S3 into the spaces S1 and S2 (see FIG. 1) through the holes 32e (see FIG. 1). Thus, without removing the lid main body 32 (see FIG. 1), the oil of the filter element 20 can be drained.

According to the present embodiment, by providing the recessed portion 71c in the valve body 71A, even when the back pressure valve 70A is in the closed state, the hydraulic oil can be caused to pass through the space between the recessed portion 71c and the upper surface 45 and flow out to the outside of the filter case 10.

Further, according to the present embodiment, because the side surface portion 45a has the shape like the side surface of the truncated cone, when the back pressure valve 70A is in the open state, the hydraulic oil can be caused to flow diagonally downward along the side surface portion 45a. For example, when the hydraulic oil flows in a lateral direction, the hydraulic oil that has flowed out of the outflow portion hits the side surface of the tank 100, and as a result, various failures (e.g., disturbance of the oil level, generation of the air bubbles) may occur. In contrast, by causing the hydraulic oil to flow diagonally downward in the above-described manner, it is possible to prevent the hydraulic oil from hitting the side surface of the tank 100, and to thus prevent the failure from occurring as a result of the hydraulic oil hitting the side surface of the tank 100.

Further, according to the present embodiment, by providing the outflow port 40a in the side surface of the outflow portion 40A, the hydraulic oil easily flows diagonally downward along the side surface portion 45a.

Fourth Embodiment

Figure 20:
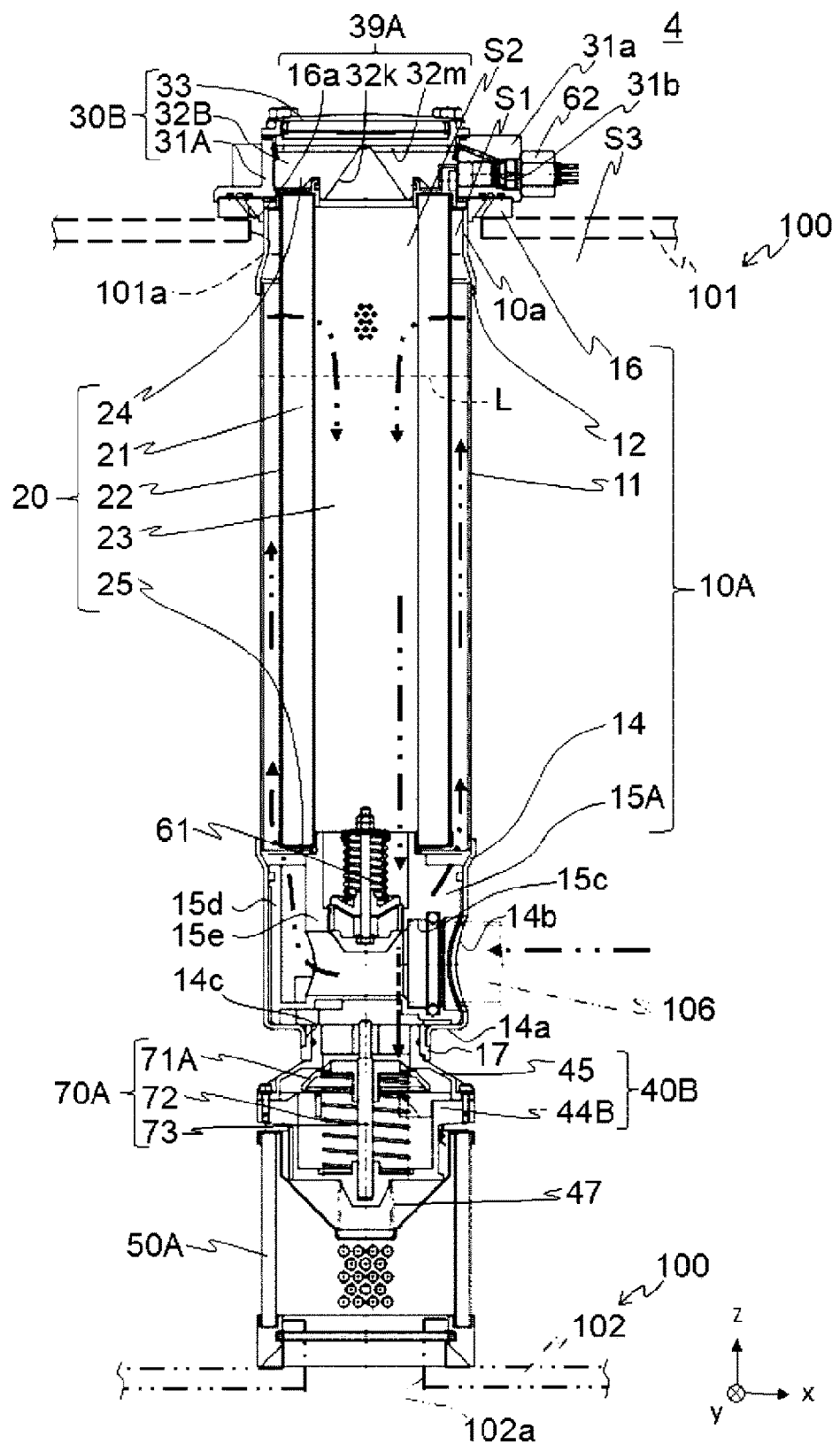
FIG. 20 is a cross-sectional view schematically illustrating a filter device 4.
Figure 21:
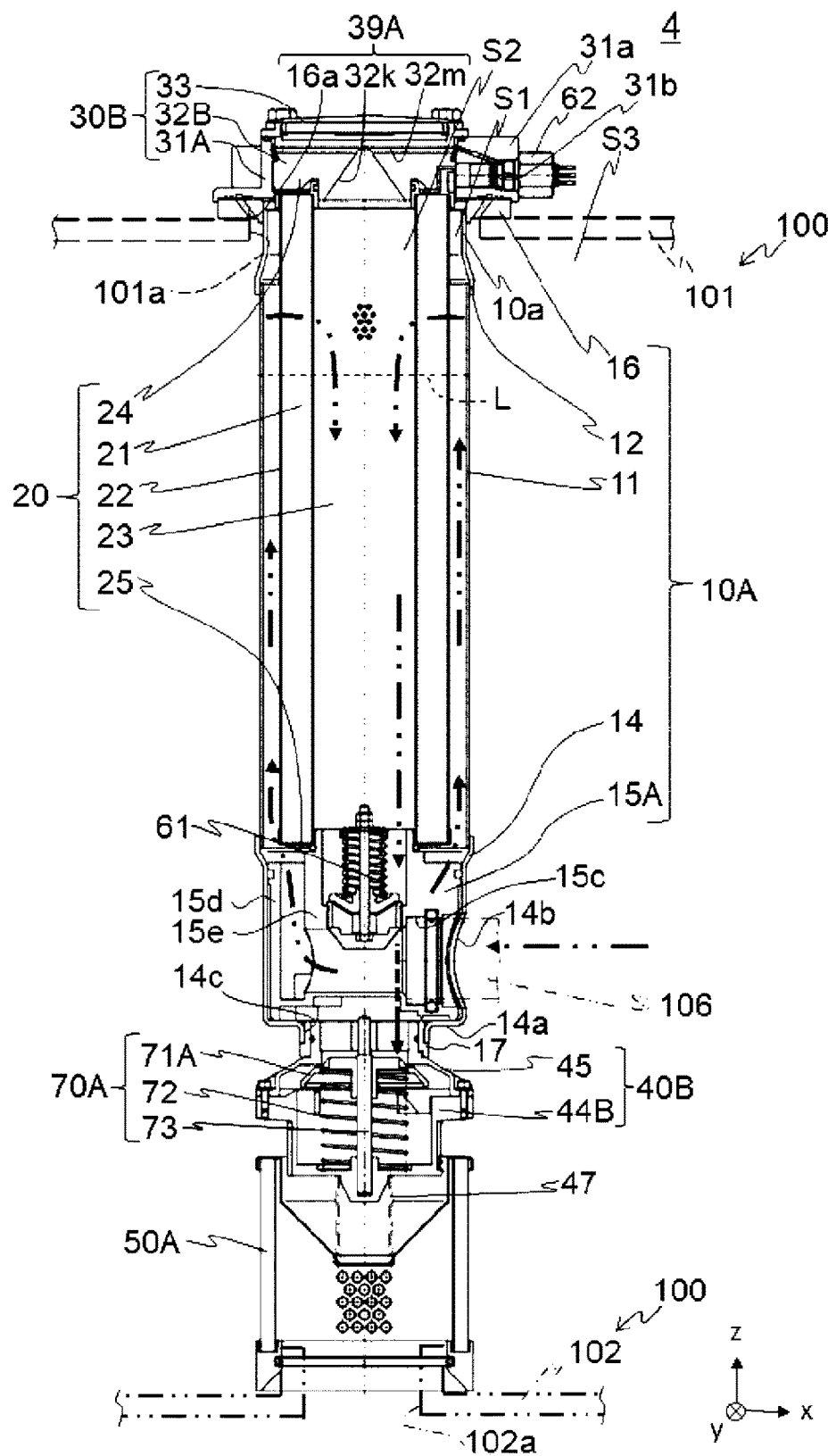
FIG. 21 is a cross-sectional view schematically illustrating the filter device 4.

A filter device 4 according to a fourth embodiment has a configuration in which the return filter is removable. The filter device 4 is obtained by integrating the return filter and the suction strainer, and is provided in the tank 100. FIGS. 20 and 21 are cross-sectional views schematically illustrating the filter device 4. A difference between FIG. 20 and FIG. 21 is the total length of the filter device 4 (described in detail later). In FIGS. 20 and 21, hatching indicating a cross section is partially omitted.

The filter device 4 mainly includes a filter case 10A, the filter element 20, a lid body 30B, an outflow portion 40B, a suction strainer 50A, and the back pressure valve 70A. Note that the same components as those in the first to third embodiments are denoted by the same reference numerals, and descriptions thereof will be omitted.

The filter case 10A has a bottomed substantially tubular shape and has an open upper end surface. Note that a substantially tubular shape is a concept including a substantially cylindrical shape, a substantially elliptic cylindrical shape, and the like, and in the present embodiment, a case is illustrated in which the substantially tubular shape is the substantially cylindrical shape.

The filter case 10A mainly includes the first case 11 having the substantially tubular shape, the second case 12 having the substantially tubular shape, the third case 14, and an inner case 15A, and a mounting member 16. The second case 12 is provided on the upper side of the first case 11, and the mounting member 16 is provided at the second case 12. The third case 14 and the inner case 15 are provided on the lower side of the first case 11.

The through-hole 14c is formed in the bottom surface 14a of the third case 14. The outflow portion 40B is provided in the through-hole 14c via a mounting member 17. However, the mounting member 17 is not necessarily formed. The outflow portion 40B causes the space inside the filter element 20 to communicate with the space outside the filter case 10. The outflow portion 40B will be described in detail later.

The inner case 15A is provided inside the third case 14, and divides a space inside the third case 14 into two. The inner case 15A includes a tubular portion 15d on the outer side and a tubular portion 15e on the inner side. The hole 15c into which the inflow pipe 106 is inserted is provided in the tubular portion 15d. The valve 61 is provided in the tubular portion 15e.

The lid body 30A is provided outside the tank 100 (in the present embodiment, on the upper side of the upper surface 101). The lid body 30A is provided on the filter case 10A (the mounting member 16) and the filter element 20 (the plate 24) so as to cover the opening in the upper end surface of the filter case 10A.

Figure 22:
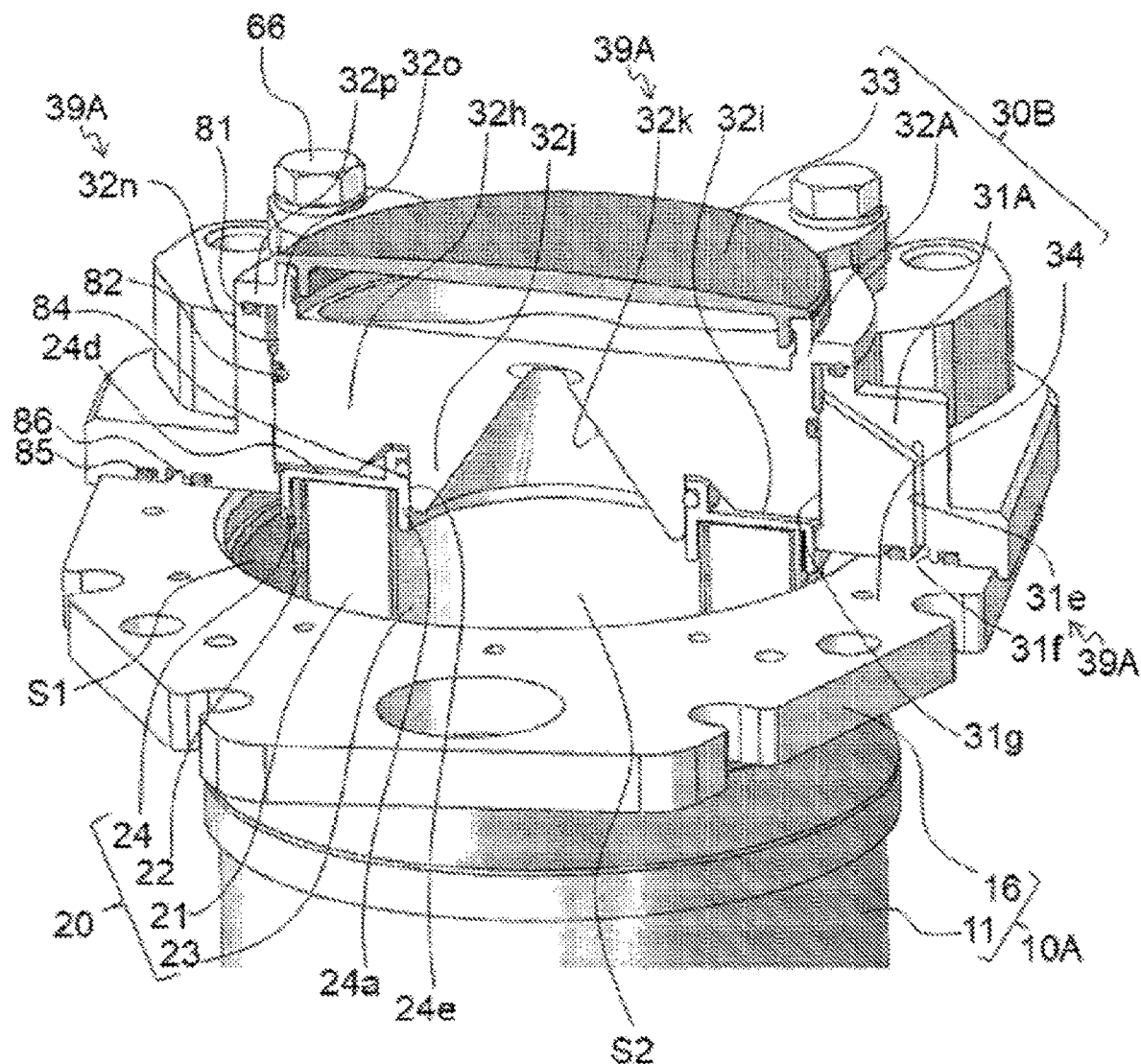
FIG. 22 is a perspective view illustrating a vicinity of a lid body 30B in an enlarged manner.

FIG. 22 is a perspective view illustrating a vicinity of a lid body 30B in an enlarged manner. In FIG. 22, the diagram is partially illustrated in a cross-sectional manner, and hatching indicating the cross section is omitted. The lid body 30B mainly includes a mounting portion 31A, the lid main body 32B, and the cover 33.

The mounting portion 31A has a substantially tubular shape and is fixed to the mounting member 16 by a screw (not illustrated in FIG. 22). Similarly to the mounting portion 31, the mounting portion 31A includes the protrusion portion 31a and the cavity 31b, and the differential pressure sensor 62 is provided in the cavity 31b (see FIGS. 20 and 21).

The mounting portion 31A includes the plurality of holes 31e that are some of the air vent holes. Further, a lower surface (a surface on the −z side) of the mounting portion 31A includes a groove 31f having a substantially annular shape in a plan view and configured to couple the plurality of holes 31e. One end of the hole 31e is open to an inner peripheral surface 31g, and the other end thereof is open to the groove 31f.

The lid main body 32B is a member having a substantially thick plate-like shape, and is provided so as to cover a hollow portion of the mounting portion 31A from the upper side of the mounting portion 31A. The lid main body 32B is fixed to the mounting portion 31A by the screws 66.

The lid main body 32B includes a tubular portion 32o protruding upward and a flange portion 32p provided on the outer side of the tubular portion 32o. The cover 33 is provided on the upper side of the tubular portion 32o. The flange portion 32p is in contact with the mounting portion 31A. The sealing members 81, 82 that prevent the leakage of the hydraulic oil are provided between the mounting portion 31A and the lid main body 32B.

Further, the lid main body 32B includes a first protrusion portion 32h that has a substantially columnar shape and is disposed on the lower side of the tubular portion 32o. A side surface of the first protrusion portion 32h is in contact with the inner peripheral surface 31g of the mounting portion 31A.

The first protrusion portion 32h includes a flat surface 32i at the tip (the end on the −z side). The flat surface 32i is in contact with an upper surface 24d of the plate 24. Further, the first protrusion portion 32h includes a second protrusion portion 32j in a central section of the tip (the end on the −z side). The second protrusion portion 32j is inserted into the tubular portion 24a, and a side surface of the second protrusion portion 32j is in contact with an inner peripheral surface 24e of the plate 24 (the tubular portion 24a).

The first protrusion portion 32h and the second protrusion portion 32j include a cavity 32k, a cavity 32m (see FIGS. 20 and 21), and a recessed portion 32*n*, which are part of an air vent hole 39A that serves as the flow path of the air and the hydraulic oil. The cavity 32*k* is an open end of the air vent hole 39A, and has a substantially conical shape or a substantially truncated cone shape whose inner diameter becomes smaller toward the upper part. The recessed portion 32*n* is provided in an outer peripheral surface of the first protrusion portion 32*h*, and is recessed in the radial direction.

The cavity 32*m* (see FIGS. 20 and 21) causes the cavity 32*k* to communicate with the recessed portion 32*n*. Further, the recessed portion 32*n* is communicated with the hole 31*e*. Furthermore, the groove 31*f* is communicated with a hole 16*a* (see FIGS. 20 and 21) of the mounting member 16. Thus, the air vent hole 39A including the hole 31*e*, the groove 31*f*, the cavity 32*k*, the cavity 32*m*, the recessed portion 32*n*, and the hole 16*a* causes the space S2 inside the filter element 20 to communicate with the space S3 outside the filter case 10A.

The description will now return to FIGS. 20 and 21. The outflow portion 40B is provided on the lower side of the filter case 10A so as to cover the through-hole 14*c* provided in the bottom surface 14*a* of the third case 14. The outflow portion 40B causes the space S2 to communicate with the space S3. The suction strainer 50A is provided on the lower side of the outflow portion 40B.

An elastic member 47 is provided between the outflow portion 40B and the suction strainer 50A. The elastic member 47 elastically deforms in accordance with the heights of the tank 100, the filter case 10A, the suction strainer 50A, and the like, and changes a distance between the outflow portion 40B and the suction strainer 50A. FIG. 20 is an example in which the distance between the outflow portion 40B and the suction strainer 50A is short, and an amount of deformation of the elastic member 47 is large. FIG. 21 is an example in which the distance between the outflow portion 40B and the suction strainer 50A is long, and the amount of deformation of the elastic member 47 is small. In this way, by providing the elastic member 47 between the outflow portion 40B and the suction strainer 50A, the height of the outflow portion 40B with respect to the suction strainer 50A can be easily adjusted.

Figure 23:
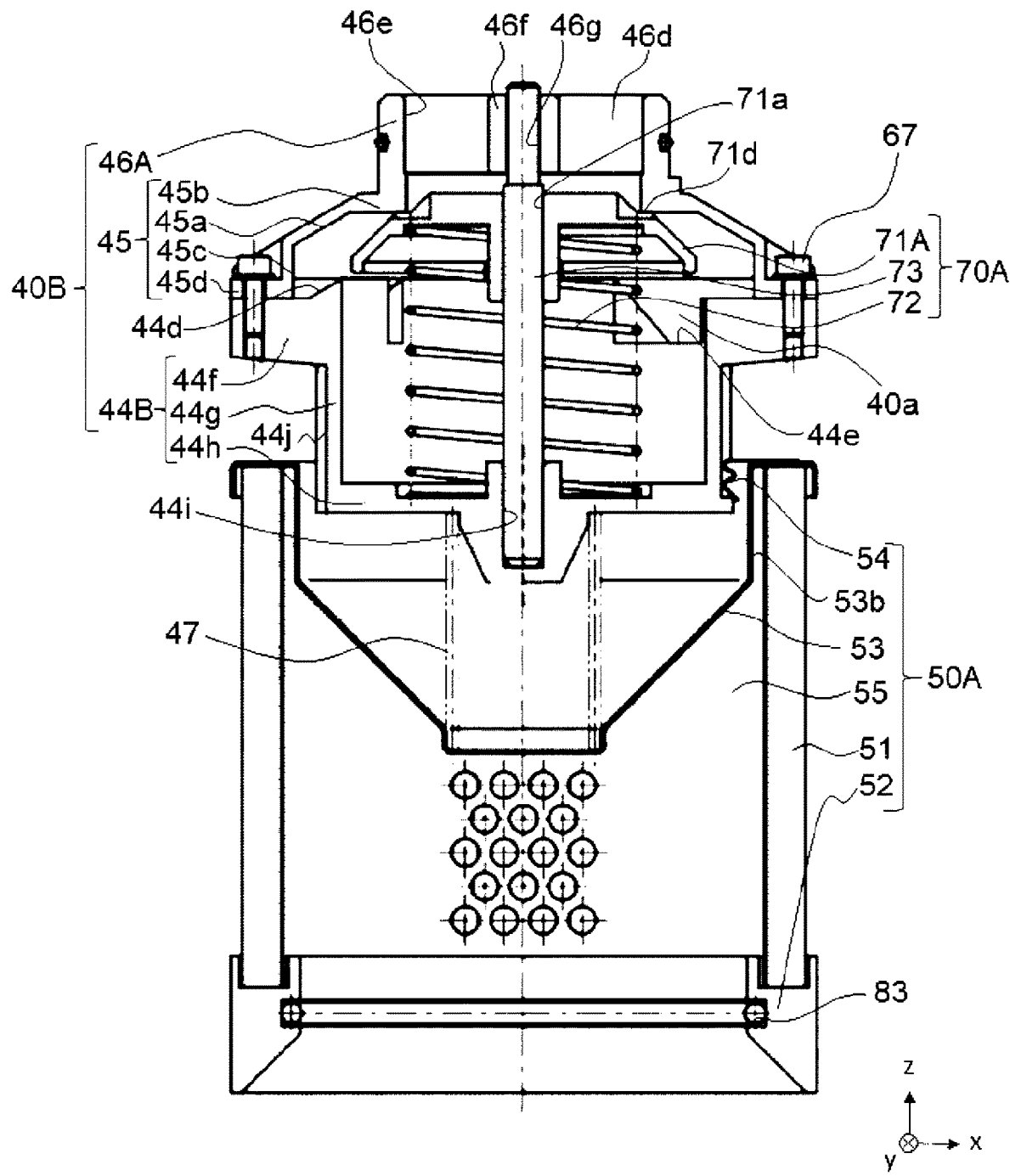
FIG. 23 is a cross-sectional view schematically illustrating an outflow portion 40B, a suction strainer 50A, and the back pressure valve 70A.
Figure 24:
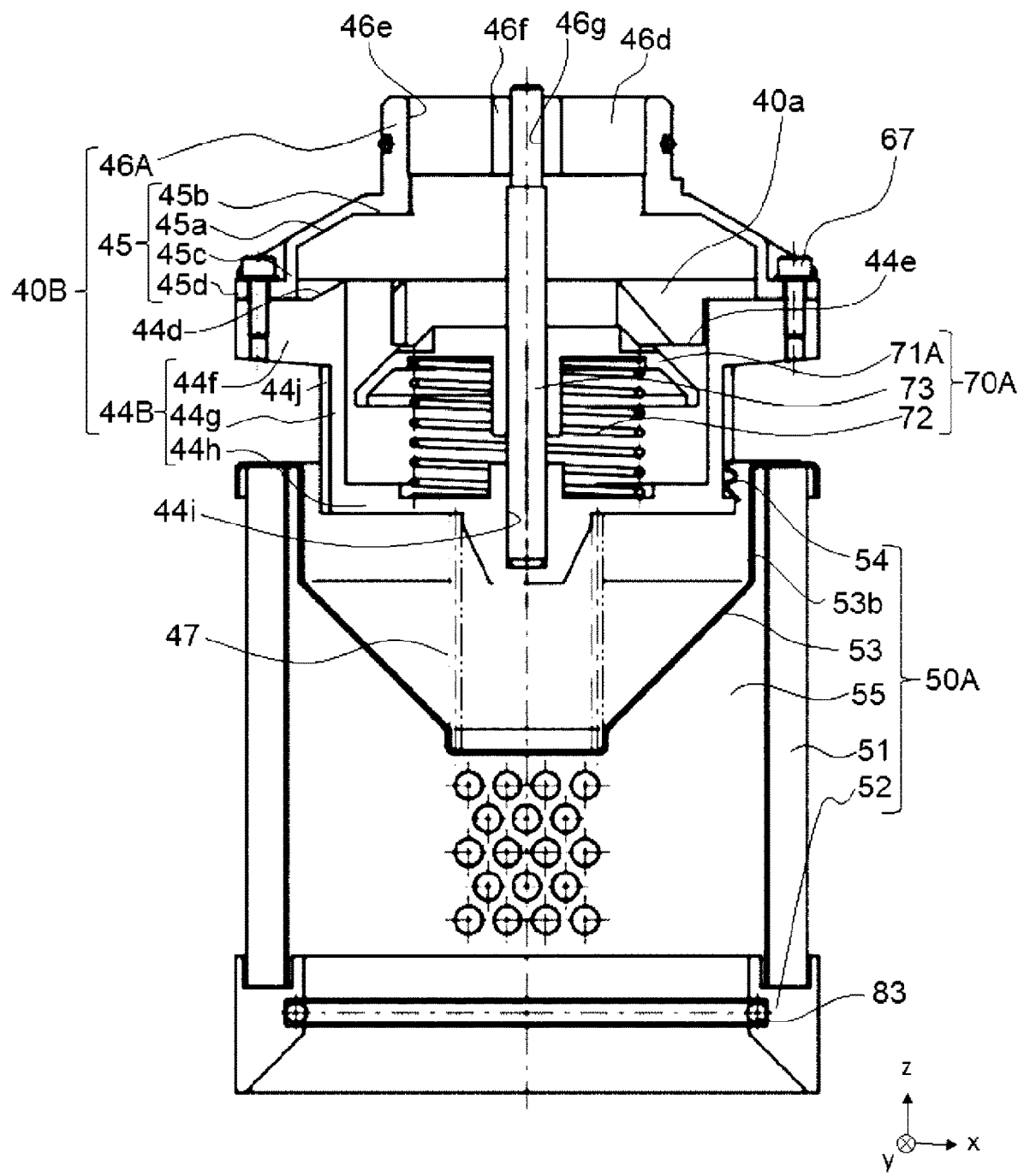
FIG. 24 is a cross-sectional view schematically illustrating the outflow portion 40B, the suction strainer 50A, and the back pressure valve 70A.

Next, the outflow portion 40B and the suction strainer 50A will be described. FIGS. 23 and 24 are cross-sectional views schematically illustrating the outflow portion 40B, the suction strainer 50A, and the back pressure valve 70A. FIG. 23 illustrates a case in which the back pressure valve 70A is in the closed state, and FIG. 24 illustrates a case in which the back pressure valve 70A is in the open state. In FIGS. 23 and 24, hatching indicating a cross section is omitted.

The outflow portion 40B mainly includes a bottom surface 44B, the upper surface 45, and a tubular portion 46A.

The tubular portion 46A has a substantially tubular shape, and is provided so as to protrude upward from the upper surface 45. By the tubular portion 46A being mounted on the filter case 10, the outflow portion 40B is provided in the filter case 10. The tubular portion 46A and the tubular portion 46 differ from each other only in the presence or absence of a screw formed in the outer peripheral surface thereof, and the remaining configuration is the same.

The bottom surface 44B includes a plate-like portion 44*f* having a substantially hollow disk shape, a tubular portion 44*g* protruding downward from the plate-like portion 44*f* substantially along an inner peripheral surface of the plate-like portion 44*f*, and a bottom surface 44*h* that covers a lower end surface of the tubular portion 44*g*. Note that the tubular portion 44*g* need not necessarily be substantially along the inner peripheral surface of the plate-like portion 44*f*. The inclined surface 44*d* protruding in the upward direction is provided at the upper end (a surface facing the upper surface 45) of the plate-like portion 44*f*. The inclined surface 44*d* is partially notched to form the recessed portion 44*e*.

The rod-like member 73 is provided in a cavity 44*i* formed in the bottom surface 44*h*. As a result, the back pressure valve 70A is provided in the outflow portion 40B. The rod-like member 73 is provided so as to extend along the vertical direction (the z direction).

The bottom surface 44B and the upper surface 45 are integrated by the screw 67. The bottom surface 44B and the upper surface 45 are provided so as to be separated from each other. A side surface of the outflow portion 40B has an opening between the bottom surface 44B and the upper surface 45, and this opening is the outflow port 40*a* through which the hydraulic oil flows out from the outflow portion 40B.

One end of the elastic member 47 is in contact with a lower surface of the bottom surface 44*h*. Thus, the outflow portion 40B is urged upward by a force from the elastic member 47.

The suction strainer 50A mainly includes the filter medium 51, the mounting member 52, a plate-like member 53, a claw 54, and an inner tube 55. The plate-like member 53 is provided on the upper side of the filter medium 51 so as to cover the hollow portion of the filter medium 51. The inner tube 55 is provided along an inner peripheral surface of the filter medium 51.

Figure 25:
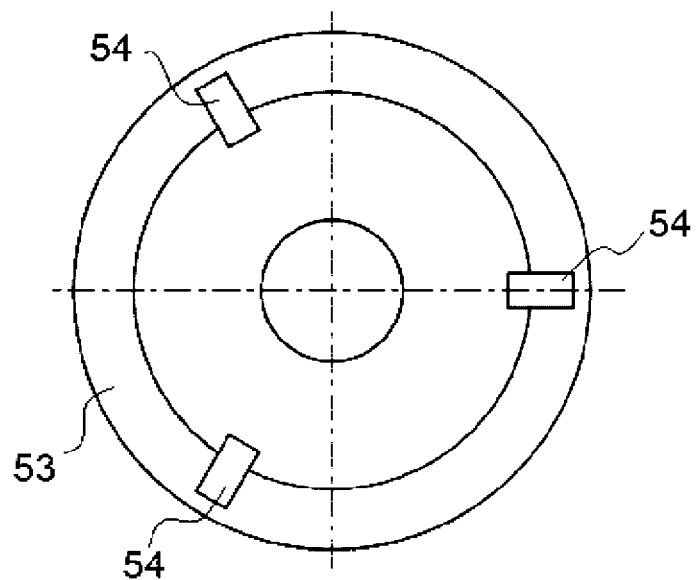
FIG. 25 is a diagram schematically illustrating the suction strainer 50A. (A) is a plan view and (B) is a cross-sectional view.
Figure 25:
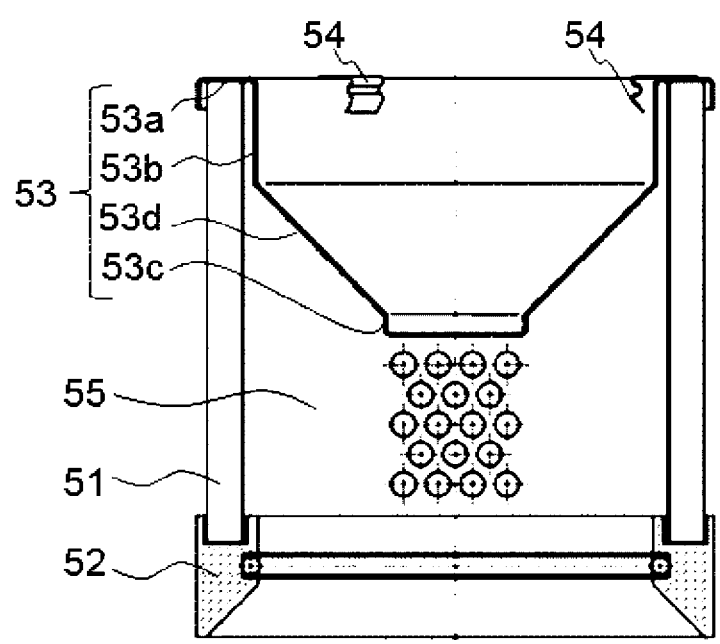

FIG. 25 is a diagram schematically illustrating the suction strainer 50A, in which FIG. 25(A) is a plan view and FIG. 25(B) is a cross-sectional view.

The plate-like member 53 mainly includes an upper end portion 53*a* that covers an upper end surface of the filter medium 51, a tubular portion 53*b* protruding downward from the upper end portion 53*a*, a bottom surface portion 53*c*, and a side surface portion 53*d* that couples the tubular portion 53*b* with the bottom surface portion 53*c*.

The tubular portion 53*b* has a substantially cylindrical shape, and has a diameter greater than that of the tubular portion 44*g* (see FIGS. 23 and 24). The bottom surface portion 53*c* has a bottomed substantially cylindrical shape, and is in contact with the one end of the elastic member 47. Thus, the suction strainer 50A is urged downward by the force from the elastic member 47.

The claw 54 is provided at the upper end portion 53*a*. The claw 54 protrudes inward in the radial direction from the upper end portion 53*a* and the tubular portion 53*b*. The claw 54 is a plate spring formed by bending a plate-like member made of metal or the like, and has elasticity.

Note that in the present embodiment, the claw 54 is provided at the upper end portion 53*a*, but the position at which the claw 54 is provided is not limited thereto, and the claw 54 may be provided at the inner peripheral surface of the tubular portion 53*b*. Further, the claw 54 is a separate component from the plate-like member 53, but the plate-like member 53 and the claw 54 may be an integrated component. Further, it is sufficient that the claw 54 has elasticity, and the claw 54 may be formed of an elastic member such as rubber or the like.

The description will now return to FIGS. 23 and 24. A groove 44*j* is formed in an outer peripheral surface of the tubular portion 44*g*. When the tubular portion 44*g* is inserted into the tubular portion 53*b*, the claw 54 comes into contact with the groove 44*j*. Then, due to the elastic force of the claw 54, the claw 54 presses against a bottom surface of the groove 44*j* (the outer peripheral surface of the tubular portion 44*g*), and the bottom surface 44B is provided on the plate-like member 53.

Figure 26:
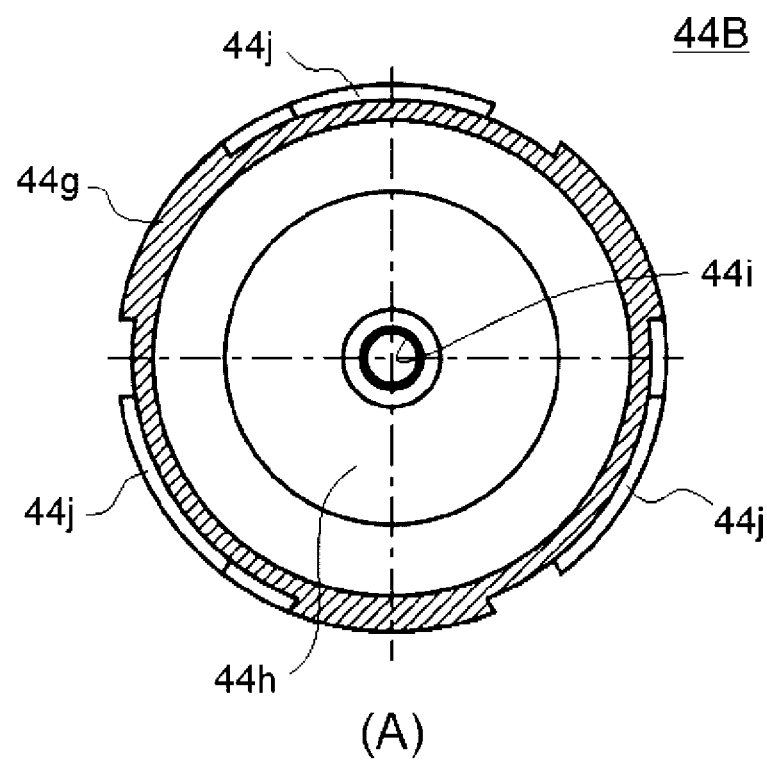
FIG. 26 is a diagram schematically illustrating a bottom surface 44B. (A) is a cross-sectional view and (B) is a perspective view.
Figure 26:
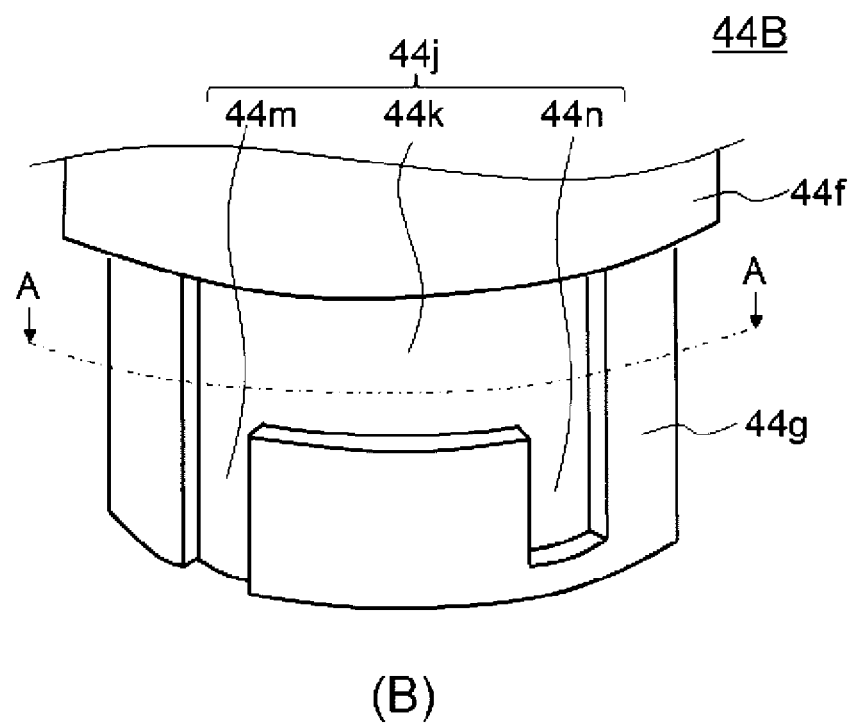

FIG. 26 is a diagram schematically illustrating the bottom surface 44B, in which FIG. 26(A) is a cross-sectional view and FIG. 26(B) is a perspective view. FIG. 26(A) illustrates a cross-sectional view of the bottom surface 44B taken along a line A-A in FIG. 26(B), as viewed from the +z direction.

The groove 44*j* has a horizontal groove 44*k* extending substantially along the horizontal direction, and vertical grooves 44*m*, 44*n* that are coupled to both ends of the horizontal groove 44*k*, respectively. The vertical grooves 44*m*, 44*n* extend downward in the vertical direction from the horizontal groove 44*k*. The lower end of the vertical groove 44*m* reaches the lower end of the tubular portion 44*g*, and the lower end of the vertical groove 44*n* does not reach the lower end of the tubular portion 44*g*.

Here, a method for mounting the outflow portion 40B (the bottom surface 44B) on the suction strainer 50A will be described. First, when the tubular portion 44*g* is inserted into the tubular portion 53*b*, the position of the vertical groove 44*m* is matched up with the position of the claw 54 in a plan view (as viewed from the +z direction). The bottom surface 44B is pushed down against the urging force of the elastic member 47, and while moving the bottom surface 44B in the −z direction, the claw 54 is moved along the vertical groove 44*m*. Then, the height of the horizontal groove 44*k* is matched up with the height of the claw 54, the bottom surface 44B is rotated in the circumferential direction to cause the claw 54 to move along the horizontal groove 44*k*, and the position of the vertical groove 44*n* is matched up with the position of the claw 54 in a plan view.

After that, when the force pushing down the bottom surface 44B is removed, the bottom surface 44B is pushed up by the urging force of the elastic member 47, and the bottom surface 44B moves in the +z direction. As a result, the claw 54 moves along the vertical groove 44*n*. Because the lower end of the vertical groove 44*n* does not reach the lower end of the tubular portion 44*g*, the bottom surface 44B does not come out.

According to the present embodiment, because the elastic member 47 is provided between the outflow portion 40B and the suction strainer 50A, the total length of the filter device 3 can be adjusted.

Further, according to the present embodiment, because the plate-like member 53 is provided in the filter medium 51, and the outflow portion 40B and the suction strainer 50A are provided as separate components, the outflow portion 40B and the suction strainer 50A can be made detachable.

Further, according to the present embodiment, by the claw 54 pressing the outer peripheral surface of the tubular portion 44*g* using the elastic force of the claw 54, the outflow portion 40B can be reliably mounted on the plate-shaped member 53 while keeping the outflow portion 40B and the suction strainer 50A detachable.

Further, according to the present embodiment, when the outflow portion 40B is mounted on the suction strainer 50A, the outflow portion 40B can be reliably mounted on the suction strainer 50A by pushing and turning the outflow portion 40B and moving the claw 54 along the groove 44*j*. Further, because the lower end of the vertical groove 44*n* does not reach the lower end of the tubular portion 44*g*, when adjusting the total length of the filter device 3 using the elastic member 47, the outflow portion 40B does not come out from the suction strainer 50A.

Further, according to the present embodiment, because the cavity 32*k*, which is the open end of the air vent hole 39A, has the substantially conical shape or the substantially truncated cone shape whose inner diameter becomes smaller toward the upper part, the air bubbles generated inside the filter element 20 are easily accumulated. Further, because the air bubbles accumulated inside the cavity 32*k* become concentrated in an area that becomes narrower as they rise upward, the air bubbles easily escape from the air vent hole 39A.

Note that in the present embodiment, the groove 44*j* is provided in the outer peripheral surface of the tubular portion 44*g*, and the outflow portion 40B is mounted on the suction strainer 50A by pushing and turning the outflow portion 40B and moving the claw 54 along the groove 44*j*, but a mode of mounting the outflow portion on the suction strainer is not limited to this example.

Figure 27:
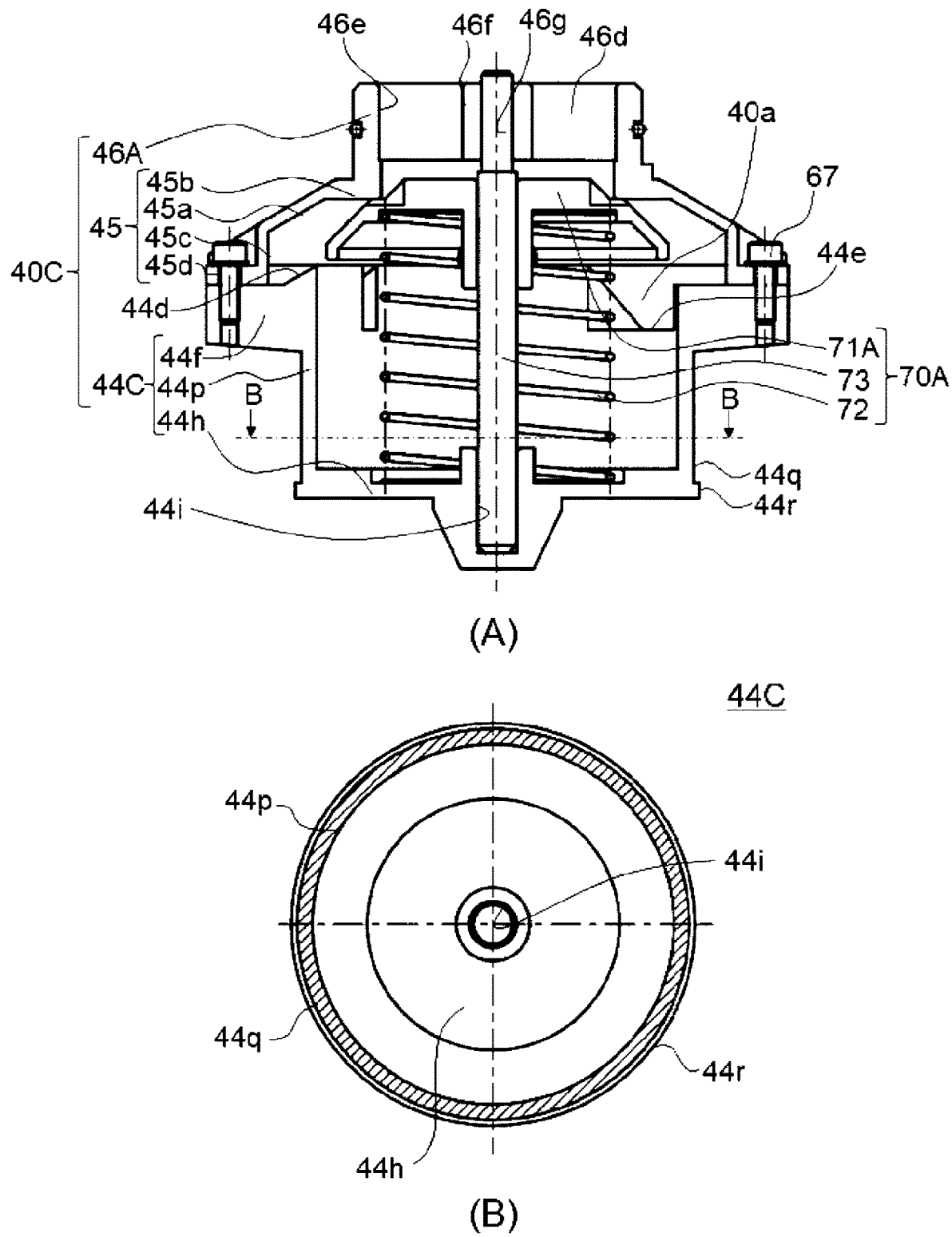
FIG. 27 is a diagram schematically illustrating an outflow portion 40C according to a modified example. (A) is a side view and (B) is a cross-sectional view.

FIG. 27 is a diagram schematically illustrating an outflow portion 40C according to a modified example, in which FIG. 27(A) is a side view and FIG. 27(B) is a cross-sectional view. FIG. 27(B) illustrates a cross-sectional view of a bottom surface 44C taken along the line B-B in FIG. 27(A), as viewed from the +z/positive z direction.

The outflow portion 40C mainly includes the bottom surface 44C, the upper surface 45, and the tubular portion 46A. The bottom surface 44C includes the plate-like portion 44*f* having the substantially hollow disk shape, a tubular portion 44*p* protruding downward from the plate-like portion 44*f*, and the bottom surface 44*h* that covers a lower end surface of the tubular portion 44*p*.

A recessed portion 44*q* is formed along the circumferential direction in an outer peripheral surface of the tubular portion 44*p*. The recessed portion 44*q* does not reach the lower end of the tubular portion 44*p*, and a projection 44*r* is formed at the lower end of the tubular portion 44*p*.

When the outflow portion 40C (the bottom surface 44C) is mounted on the suction strainer 50A, the outflow portion 40C is pushed down, and the tubular portion 44*p* is inserted into the tubular portion 53*b* (see FIG. 25). As a result, the claw 54 deforms and passes over the protrusion 44*r*, and the claw 54 comes into contact with the recessed portion 44*q*. Then, due to the elastic force of the claw 54, the claw 54 presses against an outer peripheral surface of the recessed portion 44*q*, and the bottom surface 44C is provided on the plate-like member 53.

According to the present modified example, it is not necessary to push and turn the outflow portion 40C when mounting the outflow portion 40C, and the outflow portion 40C can be mounted on the suction strainer 50A with a single operation. Further, the bottom surface 44C can be formed in a simple shape.

Note that in the present modified example, because it is not necessary to push and turn the outflow portion 40C, it is sufficient that the bottom surface 44C and the tubular portion 53*b* of the plate-like member 53 have a substantially tubular shape, and they need not necessarily have a substantially cylindrical shape.

The embodiments of the invention are described above in detail with reference to the drawings. However, specific configurations are not limited to the embodiments and also include changes in design or the like without departing from the gist of the invention. For example, in the examples described above, detailed description is made to facilitate understanding of the present invention, and the examples are not necessarily limited to examples including all the configurations described above. In addition, the configuration of an embodiment can be replaced partially with the configurations of other embodiments. In addition, addition, deletion, replacement or the like of other configurations can be made on the configurations of the embodiments.

In addition, the term "substantially" is not to be understood as merely being strictly the same, and is a concept that includes errors and modifications to an extent that does not result in loss in identity. For example, the "substantially cylindrical shape" is a concept that includes a case where, for example, the shape can be placed in the same category as the cylindrical shape, and is not strictly limited to the cylindrical shape. Further, simple expressions such as orthogonal, parallel, and identical are not to be understood as merely being strictly, for example, orthogonal, parallel, and identical, and include being, for example, substantially parallel, substantially orthogonal, and substantially identical.

In addition, the term "vicinity" means to include a range of regions (which can be determined as desired) near a position serving as a reference. For example, the term "a vicinity of an end" refers to a range of regions vicinity the end, and is a concept indicating that the end may or needs not be included.

REFERENCE SIGNS LIST 1, 2, 3, 4 Filter device
10, 10A Filter case
10a Upper end portion
11 First case
12 Second case
12a Small diameter portion
13 Mounting portion
13a Plate-like portion
14 Third case
14a Bottom surface
14b Hole
14c Through-hole
15, 15A Inner case
15a, 15b, 15d, 15e Tubular portion
15c Hole
16 Mounting member
16a Hole
17 Mounting member
20, 20A Filter element
21 Filter medium
22 Outer tube
23 Inner tube
24, 24A, 25 Plate
24a Tubular portion
24b Projection portion
24c Hole
24d Upper surface
24e Inner peripheral surface
25 Plate
30, 30A, 30B Lid body
31, 31A Mounting portion
31a Protrusion portion
31b Cavity
31c, 31e Hole
31f Groove
31g Inner peripheral surface
32, 32A, 32B Lid main body
32a Flange portion
32b First tubular portion
32c Second tubular portion
32d Plate-like portion
32e Hole
32f Projection portion
32g Rib
32h First protrusion portion
32i Flat surface
32j Second protrusion portion
32k Cavity
32m Cavity
32n Recessed portion
32o Tubular portion
32p Flange portion
33 Cover
39, 39A Air vent hole
40, 40A, 40B, 40C Outflow portion
40a Outflow port
41, 42 Tubular portion
43 Coupling portion
43a Upper surface
43b Tubular portion
43c Outflow port
43d Rib
43e, 43g, 43h Hole
43f Rod-like portion
44, 44A, 44B, 44C Bottom surface
44a Rib
44b Recessed portion
44c Rib
44d Inclined surface
44e Recessed portion
44f Plate-like portion
44g, 44p Tubular portion
44h Bottom surface
44i Cavity
44j Groove
44k Horizontal groove
44m, 44n Vertical groove
44q Recessed portion
44r Projection
45 Upper surface
45a Side surface portion
45b Flat surface portion
45c Recessed portion
45d Bottom surface
45e Hole
46 Tubular portion
46d Rib
46e Hole
46f Rod-like portion
46g Hole
47 Elastic member
50, 50A Suction strainer
51 Filter medium
52 Mounting member
53 Plate-like member
53a Upper end portion
53b Tubular portion
53c Bottom surface portion
53d Side surface portion
54 Claw
55 Inner tube
61 Valve
62 Differential pressure sensor
65, 66, 67 Screw
70, 70A Back pressure valve
71, 71A Valve body
71a Hole
71b, 71c Recessed portion
71d Flat surface portion
72 Elastic member 73 Rod-like member
81, 82, 83 Sealing member
100 Tank
101 Upper surface
101a Opening
102 Bottom surface
102a Outflow port
105 Mounting plate
105a Notch
106 Inflow pipe

The invention claimed is:

1. A filter device provided in a tank for storing liquid, the filter device comprising:
a filter case mounted on the tank and having a bottomed tubular shape with an open upper end;
a filter element provided inside the filter case and including a first filter medium having a tubular shape;
a lid body provided at the filter case and the filter element to cover the upper end of the filter case, and including an air vent hole configured to cause a space inside the filter element to communicate with a space outside the filter case;
an inflow portion configured to cause the liquid to flow into an interior of the filter case and a space outside the filter element;
an outflow portion configured to cause the space inside the filter element to communicate with the space outside the filter case;
a back pressure valve provided at the outflow portion; and
a second filter medium having a tubular shape,
wherein
the outflow portion includes an upper surface and a bottom surface provided separated from each other, and a first tubular portion provided protruding in an upward direction from the upper surface and mounted in a through-hole formed in the filter case,
the upper surface includes a first hole that communicates with a hollow portion of the first tubular portion and through which the liquid flows into the outflow portion,
an outflow port through which the liquid flows out from the outflow portion is provided in a side surface or the upper surface of the outflow portion,
the back pressure valve includes a valve body having a plate shape, and a first elastic member provided between the bottom surface and the valve body,
the valve body is movable between a closed position in which the valve body is in contact with the upper surface and covers the first hole, and an open position in which the valve body is not in contact with the upper surface,
a recessed portion is provided in a surface, of the valve body, that comes into contact with the upper surface,
in the closed position, a space formed between the recessed portion and the upper surface causes the space inside the filter element to communicate with the space outside the filter case,
an upper side of the second filter medium is covered by the bottom surface,
a mounting member is provided on a lower side of the second filter medium, and
the second filter medium is provided in the tank via the mounting member.

2. The filter device according to claim 1, wherein
the filter case is provided inside the tank,
the lid body is provided on an upper side of the tank, and
both ends of the air vent hole are open in a surface on the lower side of the lid body, and cause the space inside the filter element to communicate with the space outside the filter case and a space inside the tank.

3. The filter device according to claim 1, wherein
a portion, of the filter case, adjacent to an opening at an upper end of the filter case is narrowed.

4. A filter device provided in a tank for storing liquid, the filter device comprising:
a filter case mounted on the tank and having a bottomed tubular shape with an open upper end;
a filter element provided inside the filter case and including a first filter medium having a tubular shape;
a lid body provided at the filter case and the filter element to cover the upper end of the filter case, and including an air vent hole configured to cause a space inside the filter element to communicate with a space outside the filter case;
an inflow portion configured to cause the liquid to flow into an interior of the filter case and a space outside the filter element;
an outflow portion configured to cause the space inside the filter element to communicate with the space outside the filter case;
a back pressure valve provided at the outflow portion; and
a second filter medium having a tubular shape,
wherein
the outflow portion includes an upper surface and a bottom surface provided separated from each other, and a first tubular portion provided protruding in an upward direction from the upper surface and mounted in a through-hole formed in the filter case,
the upper surface includes a first hole that communicates with a hollow portion of the first tubular portion and through which the liquid flows into the outflow portion,
an outflow port through which the liquid flows out from the outflow portion is provided in a side surface or the upper surface of the outflow portion,
the back pressure valve includes a valve body having a plate shape, and a first elastic member provided between the bottom surface and the valve body,
the valve body is movable between a closed position in which the valve body is in contact with the upper surface and covers the first hole, and an open position in which the valve body is not in contact with the upper surface,
a recessed portion is provided in a surface, of the valve body, that comes into contact with the upper surface,
in the closed position, a space formed between the recessed portion and the upper surface causes the space inside the filter element to communicate with the space outside the filter case,
a plate-shaped member configured to cover an upper side of the second filter medium is provided on the upper side of the second filter medium,
the bottom surface is detachably provided at the plate-shaped member,
a second elastic member is provided between the plate-shaped member and the bottom surface,
a mounting member is provided on a lower side of the second filter medium, and
the second filter medium is provided in the tank via the mounting member.

5. The filter device according to claim 4, wherein
the bottom surface includes a second tubular portion protruding downward and having a tubular shape,
the plate-shaped member includes a third tubular portion having a diameter greater than a diameter of the second tubular portion and having a tubular shape, and a claw portion provided protruding inward in a radial direction of the third tubular portion, the claw portion has elasticity, and the claw portion elastically deforms and presses against the second tubular portion when the second tubular portion is inserted into an inner side of the third tubular portion.

6. The filter device according to claim 5, wherein the second tubular portion has a cylindrical shape, a groove including a first groove extending along a horizontal direction, and a second groove and a third groove respectively provided at both ends of the first groove, is formed in an outer peripheral surface of the second tubular portion, the second groove and the third groove extend from the first groove toward a lower side in a vertical direction, a lower end of the second groove reaches a lower end of the second tubular portion, and a lower end of the third groove does not reach the lower end of the second tubular portion.

7. The filter device according to claim 1, wherein the filter element includes an upper plate provided at an end on an upper side of the first filter medium;

a projection portion protruding downward is formed at a back surface of the lid body, and a second hole into which the projection portion is inserted is formed in the upper plate.

8. The filter device according to claim 1, wherein the filter element includes an upper plate provided at an end on an upper side of the first filter medium;

the upper plate includes a fourth tubular portion disposed adjacent to an inner side of the first filter medium and having a tubular shape, the lid body includes a protrusion portion, a tip of the protrusion portion being inserted into the fourth tubular portion, the air vent hole includes an open end formed in the protrusion portion; and the open end has a conical shape or a truncated cone shape having an inner diameter becoming smaller toward its upper part.

9. The filter device according to claim 1, wherein the upper surface includes a side surface portion having a truncated cone shape.

10. A filter device provided in a tank for storing liquid, the filter device comprising:

a filter case mounted on the tank and having a bottomed tubular shape with an open upper end;

a filter element provided inside the filter case and including a first filter medium having a tubular shape;

a lid body provided at the filter case and the filter element to cover the upper end of the filter case, and including an air vent hole configured to cause a space inside the filter element to communicate with a space outside the filter case;

an inflow portion configured to cause the liquid to flow into an interior of the filter case and a space outside the filter element;

an outflow portion configured to cause the space inside the filter element to communicate with the space outside the filter case;

a back pressure valve provided at the outflow portion; and wherein the outflow portion includes an upper surface and a bottom surface provided separated from each other, and a first tubular portion provided protruding in an upward direction from the upper surface and mounted in a through-hole formed in the filter case, the upper surface includes a first hole that communicates with a hollow portion of the first tubular portion and through which the liquid flows into the outflow portion, an outflow port through which the liquid flows out from the outflow portion is provided in a side surface or the upper surface of the outflow portion, the back pressure valve includes a valve body having a plate shape, and a first elastic member provided between the bottom surface and the valve body, the valve body is movable between a closed position in which the valve body is in contact with the upper surface and covers the first hole, and an open position in which the valve body is not in contact with the upper surface, a recessed portion is provided in a surface, of the valve body, that comes into contact with the upper surface, in the closed position, a space formed between the recessed portion and the upper surface causes the space inside the filter element to communicate with the space outside the filter case, the outflow port is formed in the upper surface at a position overlapping with the recessed portion in a top plan view.

11. The filter device according to claim 1, wherein the side surface of the outflow portion has an opening between the bottom surface and the upper surface, the opening being the outflow port.

12. The filter device according to claim 11, wherein an inclined surface is provided at a surface, of the bottom surface, facing the upper surface.

13. The filter device according to claim 12, wherein the inclined surface is partially notched.

14. The filter device according to claim 4, wherein the filter case is provided inside the tank, the lid body is provided on an upper side of the tank, and both ends of the air vent hole are open in a surface on the lower side of the lid body, and cause the space inside the filter element to communicate with the space outside the filter case and a space inside the tank.

15. The filter device according to claim 4, wherein the inclined surface is partially notched.

16. The filter device according to claim 4, wherein the filter element includes an upper plate provided at an end on an upper side of the first filter medium;

the upper plate includes a fourth tubular portion disposed adjacent to an inner side of the first filter medium and having a tubular shape, the lid body includes a protrusion portion, a tip of the protrusion portion being inserted into the fourth tubular portion, the air vent hole includes an open end formed in the protrusion portion; and the open end has a conical shape or a truncated cone shape having an inner diameter becoming smaller toward its upper part.

17. The filter device according to claim 4, wherein the upper surface includes a side surface portion having a truncated cone shape.

* * * * *